(12) United States Patent
Kobayashi

(10) Patent No.: US 12,175,098 B2
(45) Date of Patent: Dec. 24, 2024

(54) STORAGE DEVICE

(71) Applicant: Kioxia Corporation, Tokyo (JP)

(72) Inventor: Hirotomo Kobayashi, Yokosuka (JP)

(73) Assignee: Kioxia Corporation, Tokyo (JP)

(*) Notice: Subject to any disclaimer, the term of this patent is extended or adjusted under 35 U.S.C. 154(b) by 0 days.

(21) Appl. No.: 18/174,864

(22) Filed: Feb. 27, 2023

(65) Prior Publication Data

US 2024/0094924 A1 Mar. 21, 2024

(30) Foreign Application Priority Data

Sep. 15, 2022 (JP) .................................. 2022-147216

(51) Int. Cl.
*G06F 3/06* (2006.01)

(52) U.S. Cl.
CPC .......... *G06F 3/0622* (2013.01); *G06F 3/0637* (2013.01); *G06F 3/0679* (2013.01)

(58) Field of Classification Search
CPC ..... G06F 3/0622; G06F 3/0637; G06F 3/0679
USPC ....................................................... 711/103
See application file for complete search history.

(56) References Cited

U.S. PATENT DOCUMENTS

| | | | |
|---|---|---|---|
| 10,177,920 B2 | 1/2019 | Ohara | |
| 10,963,543 B2 | 3/2021 | Takumi et al. | |
| 2014/0298448 A1* | 10/2014 | Nagai | G06F 3/0637 726/18 |
| 2015/0067824 A1* | 3/2015 | Chatterton | G06F 21/36 726/19 |
| 2017/0093583 A1* | 3/2017 | Ohara | H04L 63/0823 |
| 2020/0204530 A1 | 6/2020 | Kumar et al. | |
| 2020/0264820 A1* | 8/2020 | Takano | G06F 3/1236 |

\* cited by examiner

*Primary Examiner* — Charles Rones
*Assistant Examiner* — Jonah C Krieger
(74) *Attorney, Agent, or Firm* — Oblon, McClelland, Maier & Neustadt, L.L.P.

(57) ABSTRACT

According to one embodiment, a storage device includes a nonvolatile memory and a controller. The controller manages first user identification information and first authentication information including a hash value calculated from the first user identification information and a first device identification information of a first client device. The controller receives an access request to the nonvolatile memory, user identification information, and authentication information transmitted from an external device, and accepts the access request in a case where the user identification information received matches the first user identification information, and the authentication information received matches the first authentication information.

10 Claims, 18 Drawing Sheets

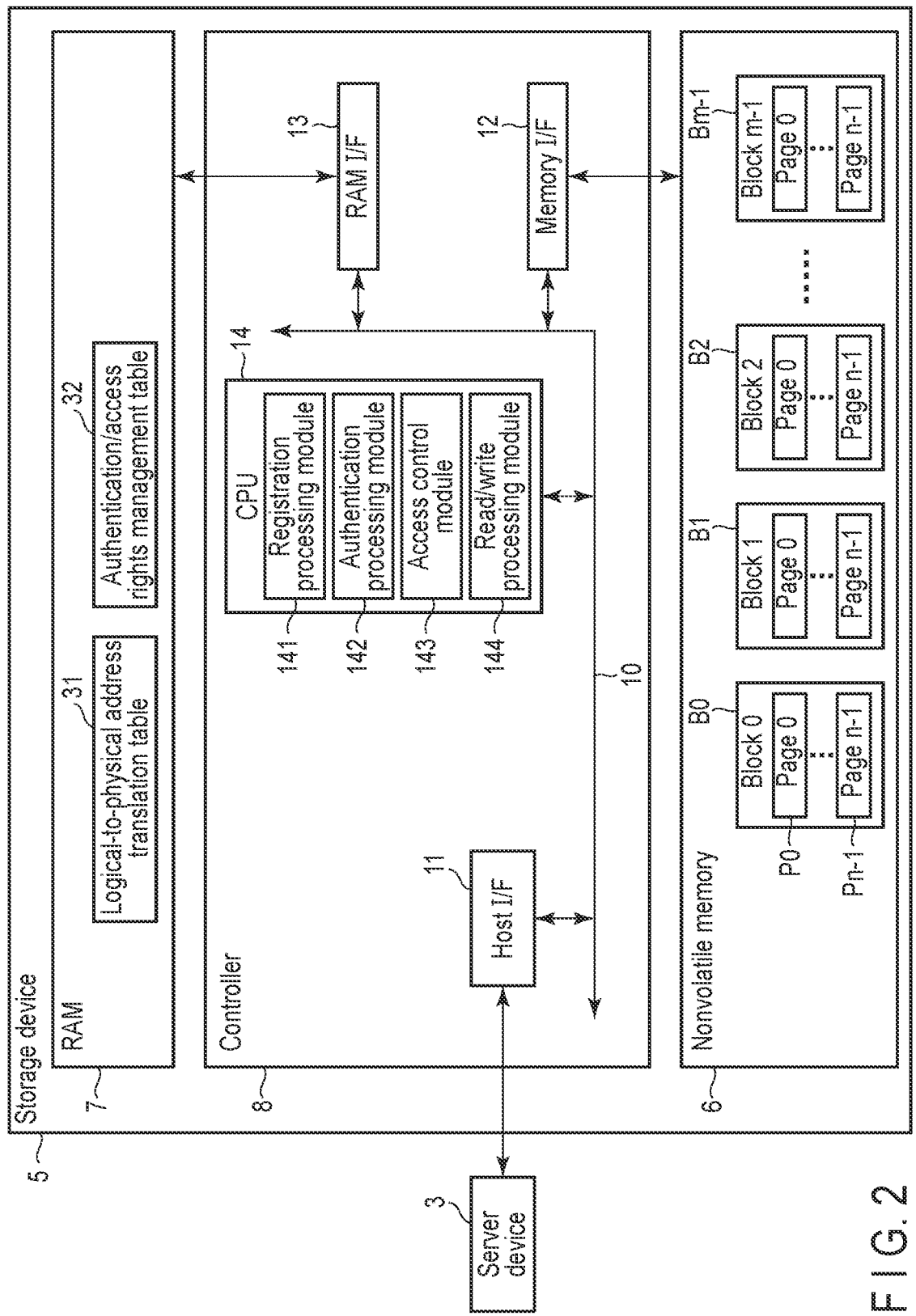
F I G. 2

| User ID | Authentication information | Access rights | | | |
|---|---|---|---|---|---|
| | | First LBA range | Second LBA range | ... | M-th LBA range |
| User01 | b8d68c891a3c3f9f77acf8e6a9b51871 a75128f5b66447cfd19411e0ee7784ff 4a8594ef0df0d6c40b724e45d1454759 | R | R | ... | R |
| User01 | 0924d6685e278cc3cca81fb25d5c4609 c99edbadb4a61c05dadee1065b3067f 2e4999ab1d450540a67d08fdb0111ba 75 | RW | RW | ... | RW |
| User02 | e32cccf43f6fb2be2e0bc213ae97454c 13d7fce0e9baa2cfc6c6ad509bf052230 25dfc35531067cae311a28fb03b0fb | RW | R | ... | RW |
| User03 | f2347269af7ba56a6734e4e7652bd939 494b768e054ca682de18542ef4ced05 d1045816b17a06e57eb8755bc52c006 1b | RW | RW | ... | — |
| ... | ... | ... | ... | ... | ... |

R:Read permission, W:Write permission, —:Access inhibition

FIG. 3

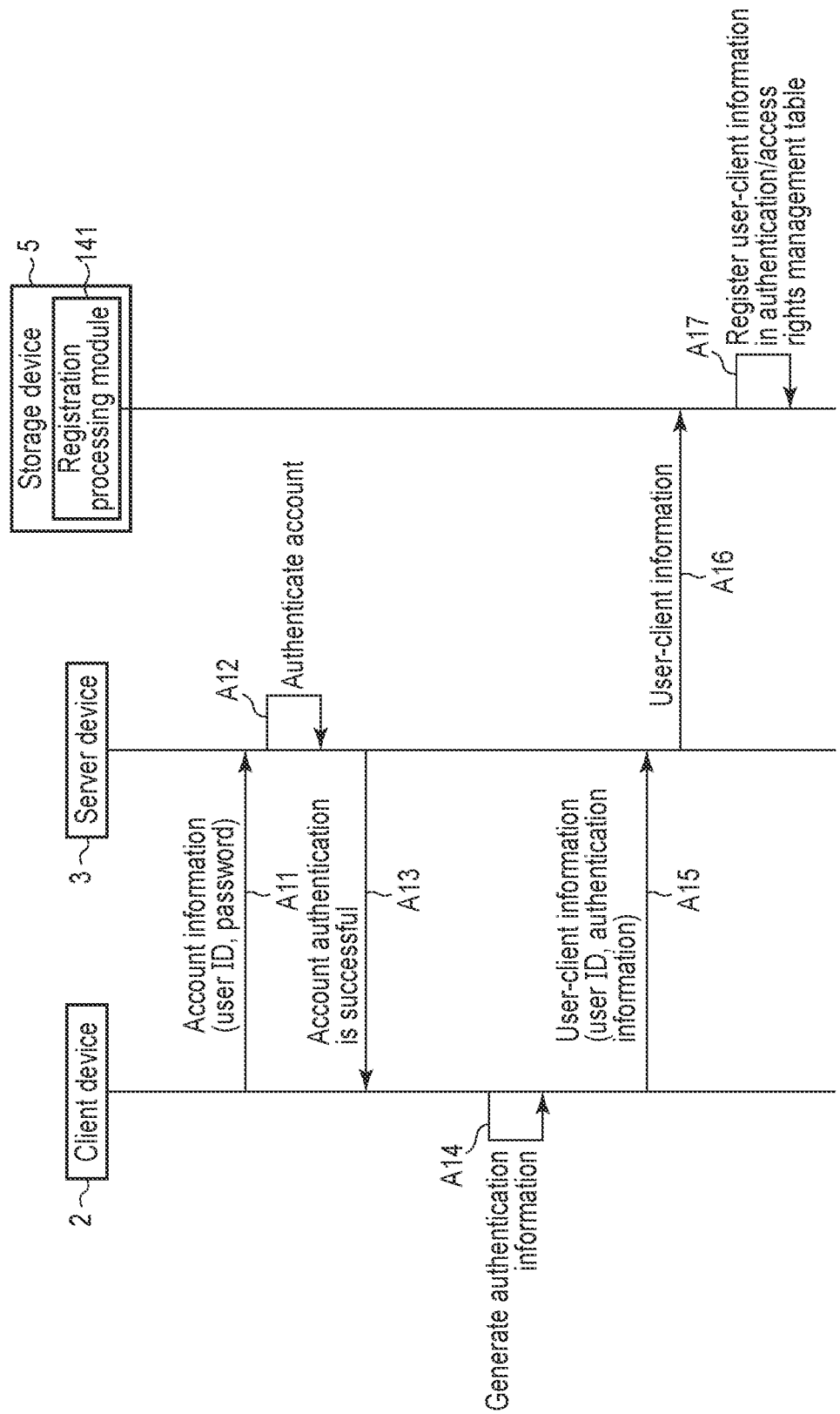
F I G. 4

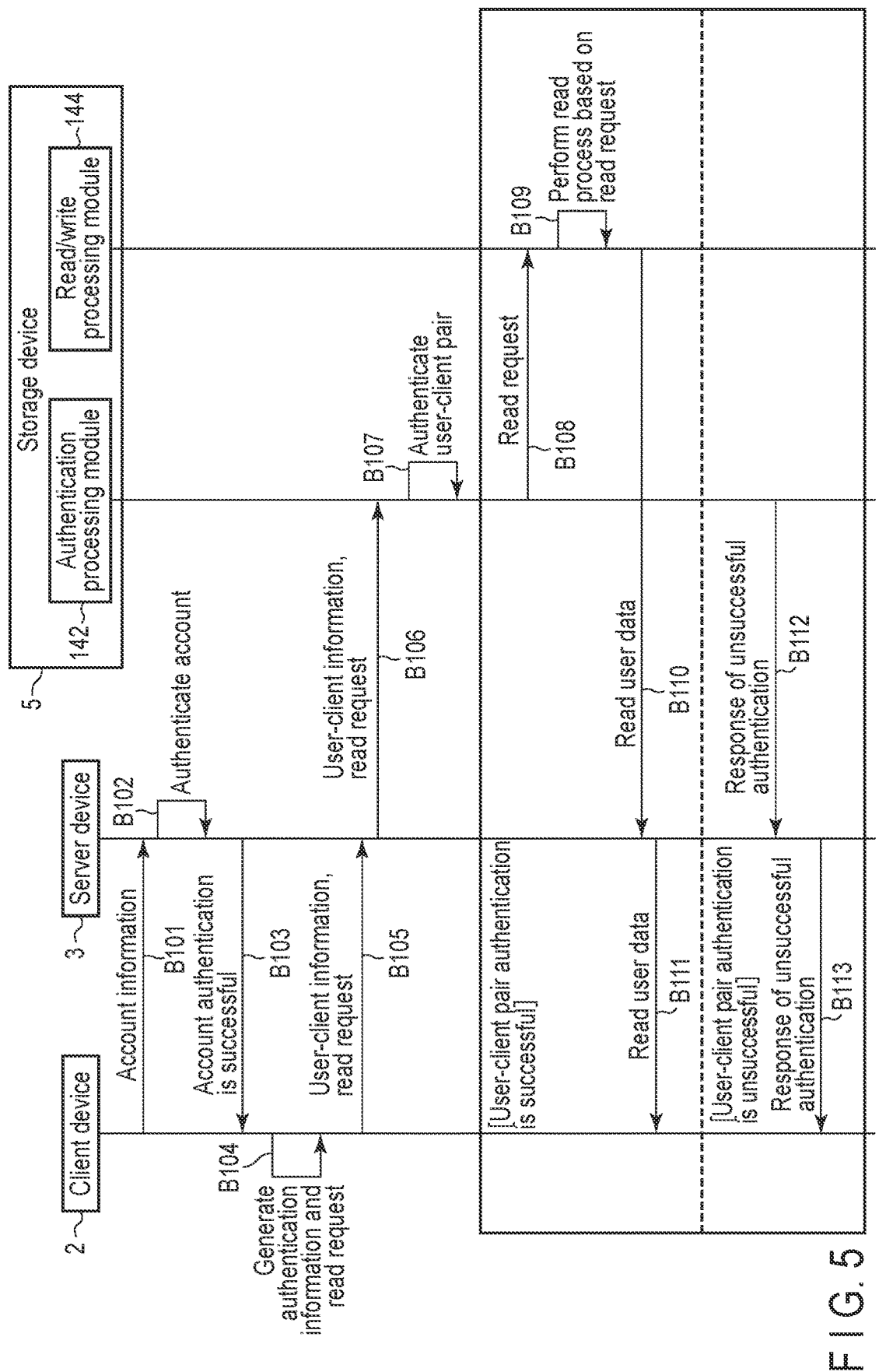
F I G. 5

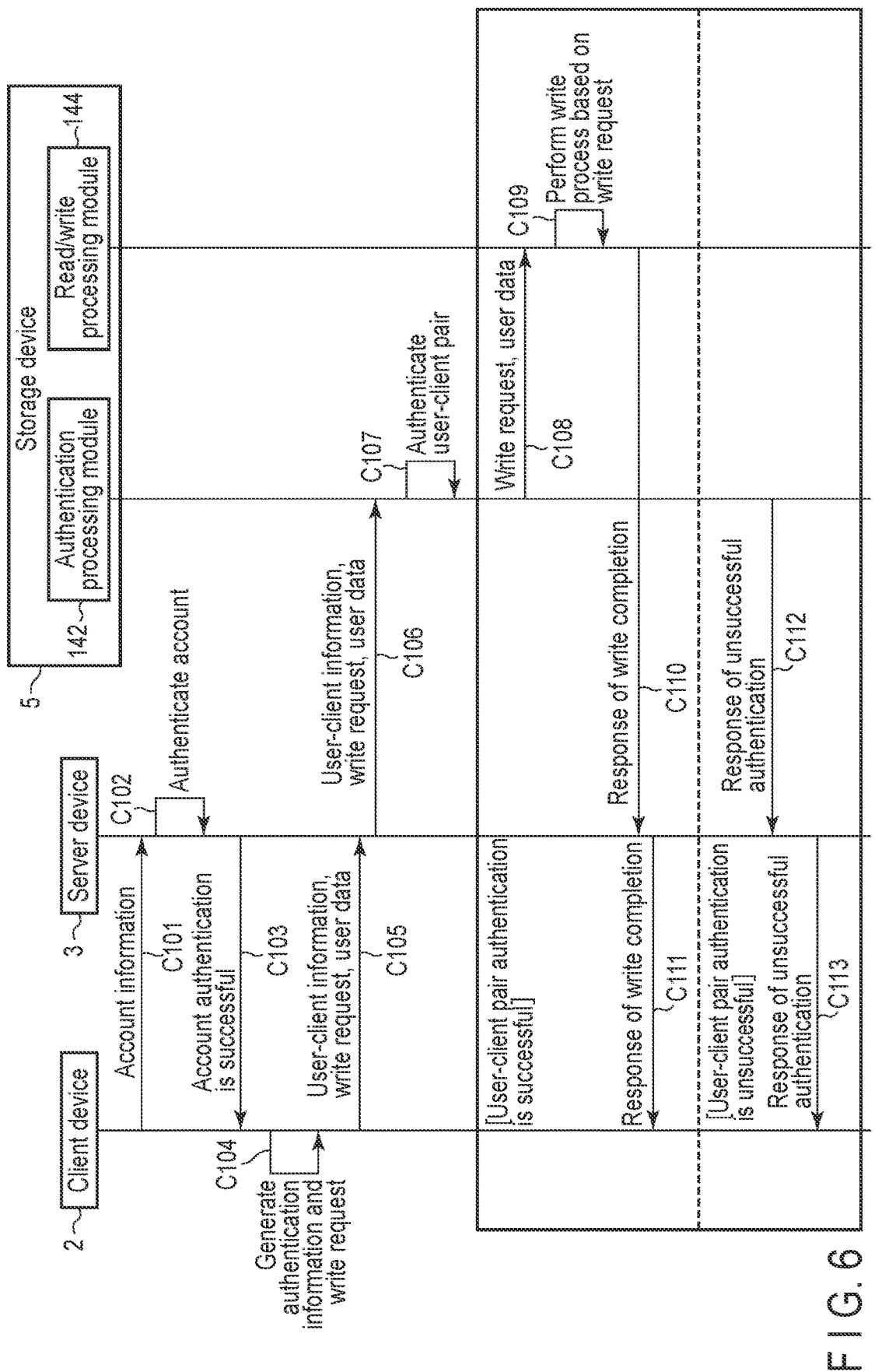
F I G. 6

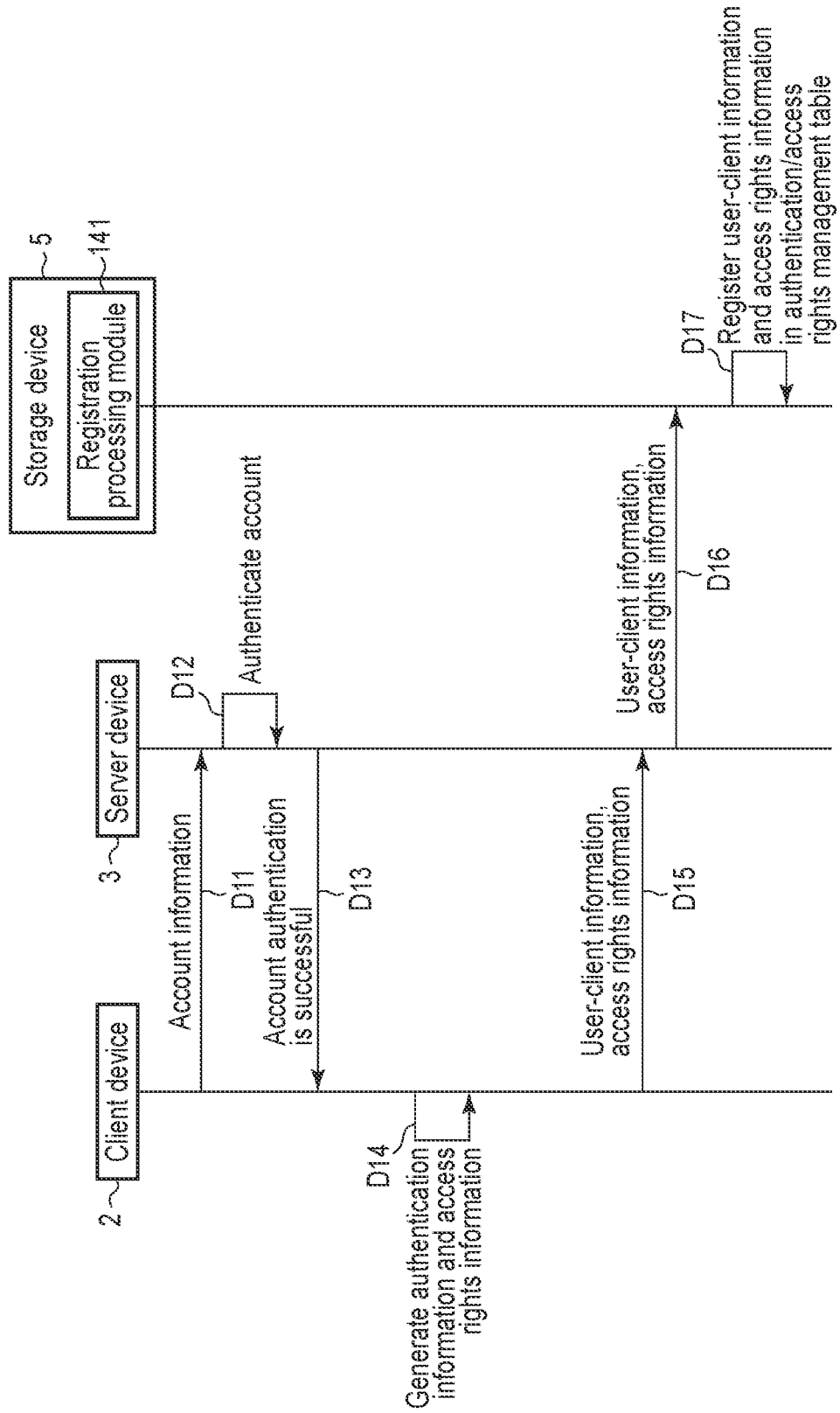
F I G. 7

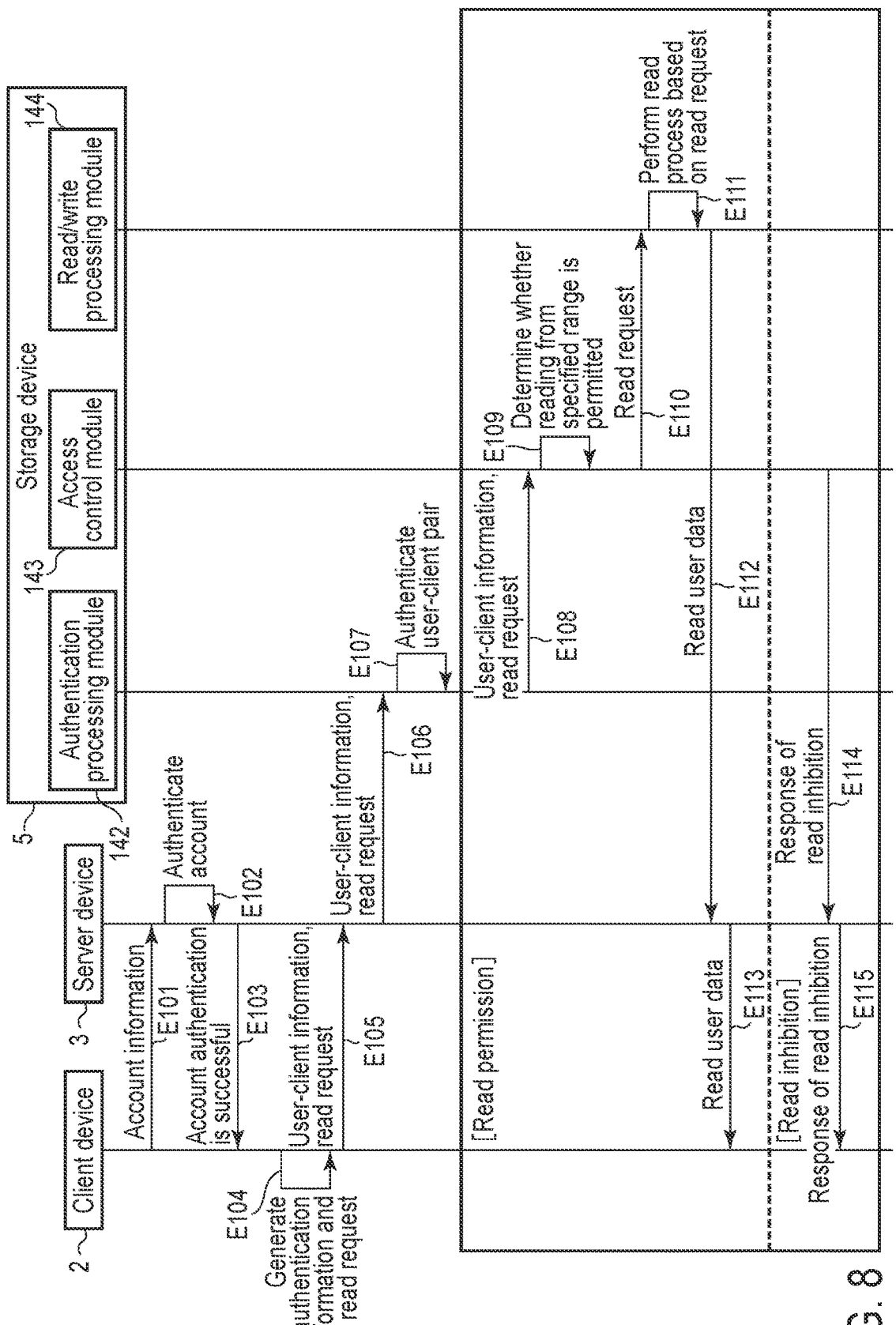
F I G. 8

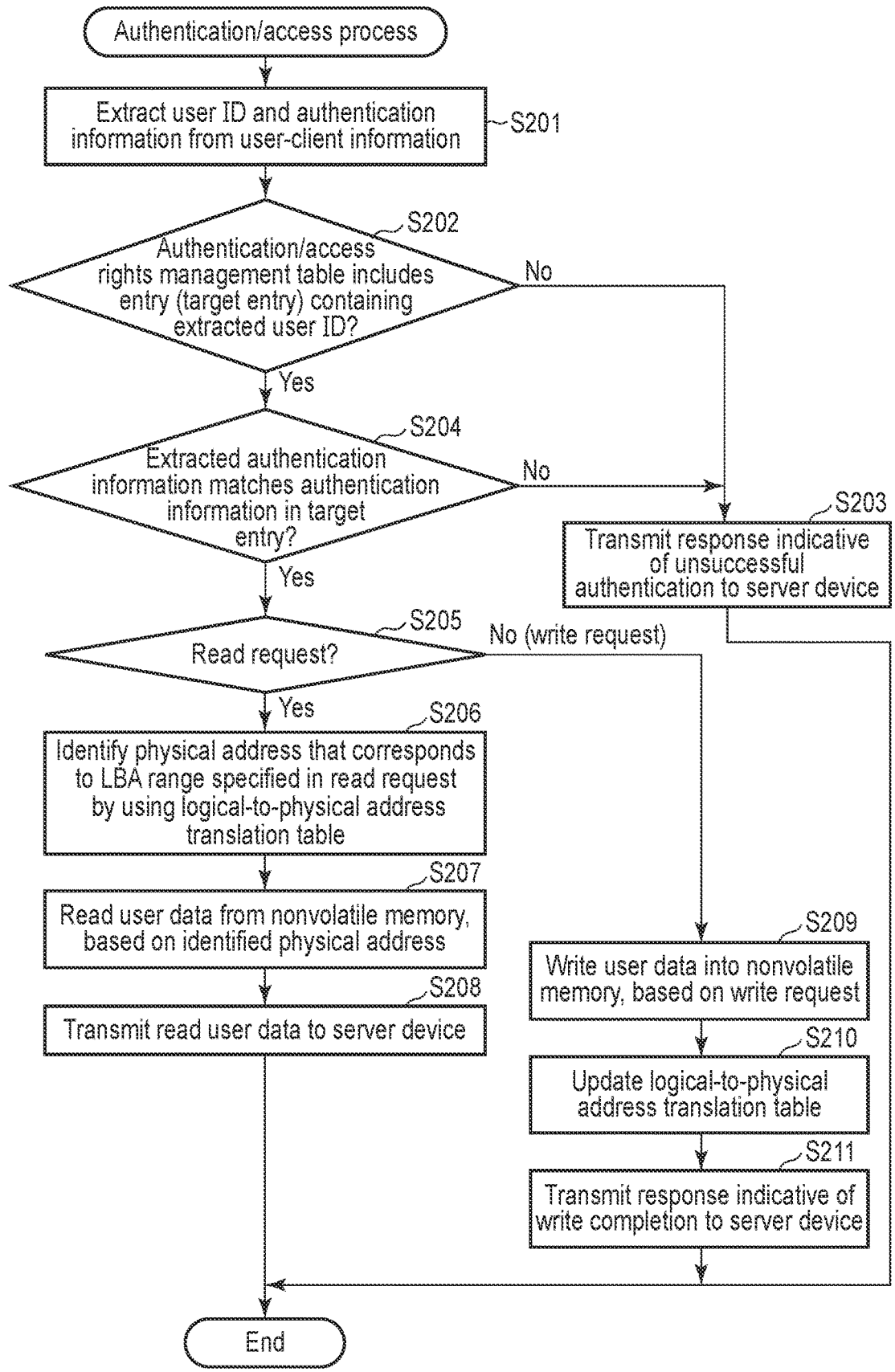
F I G. 10

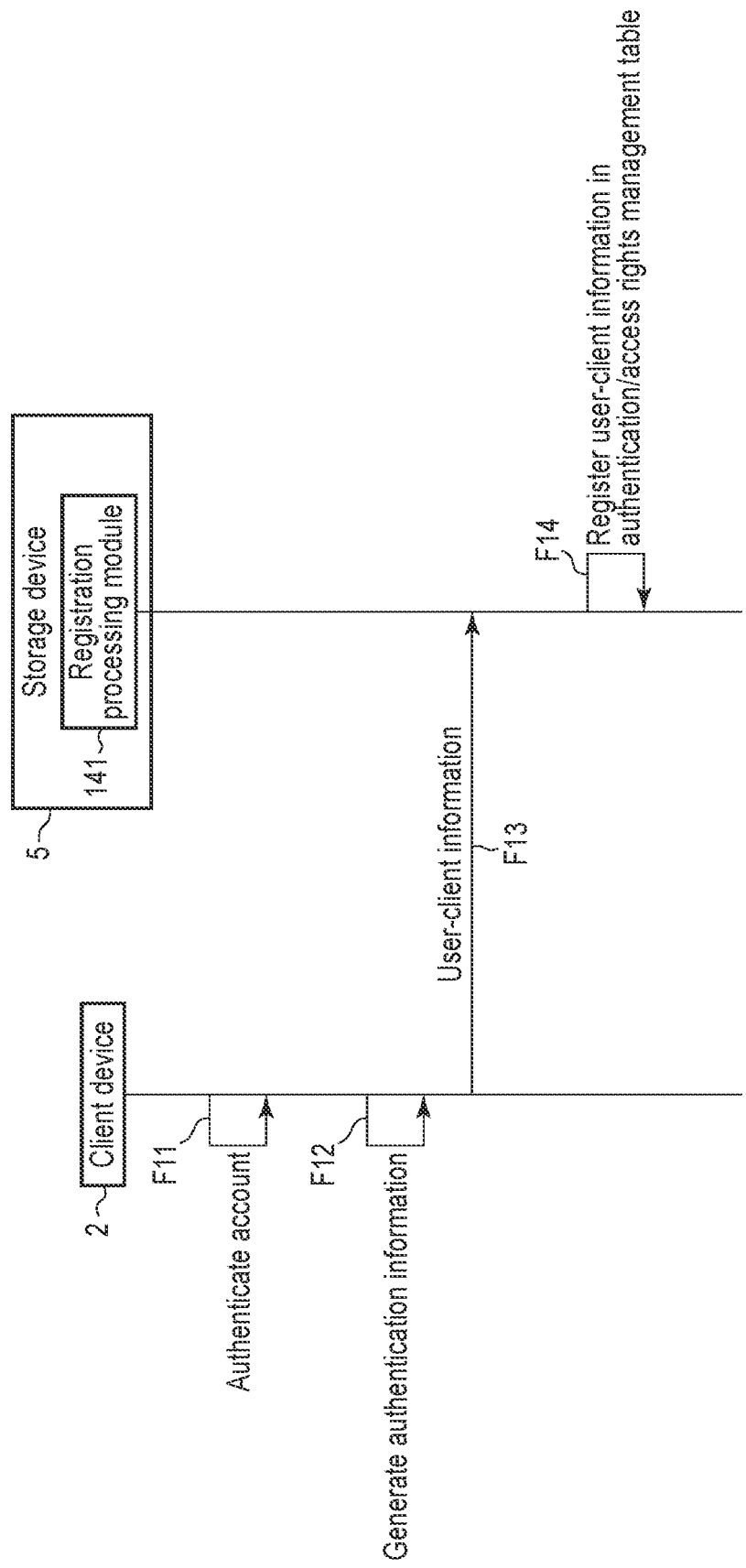
F I G. 13

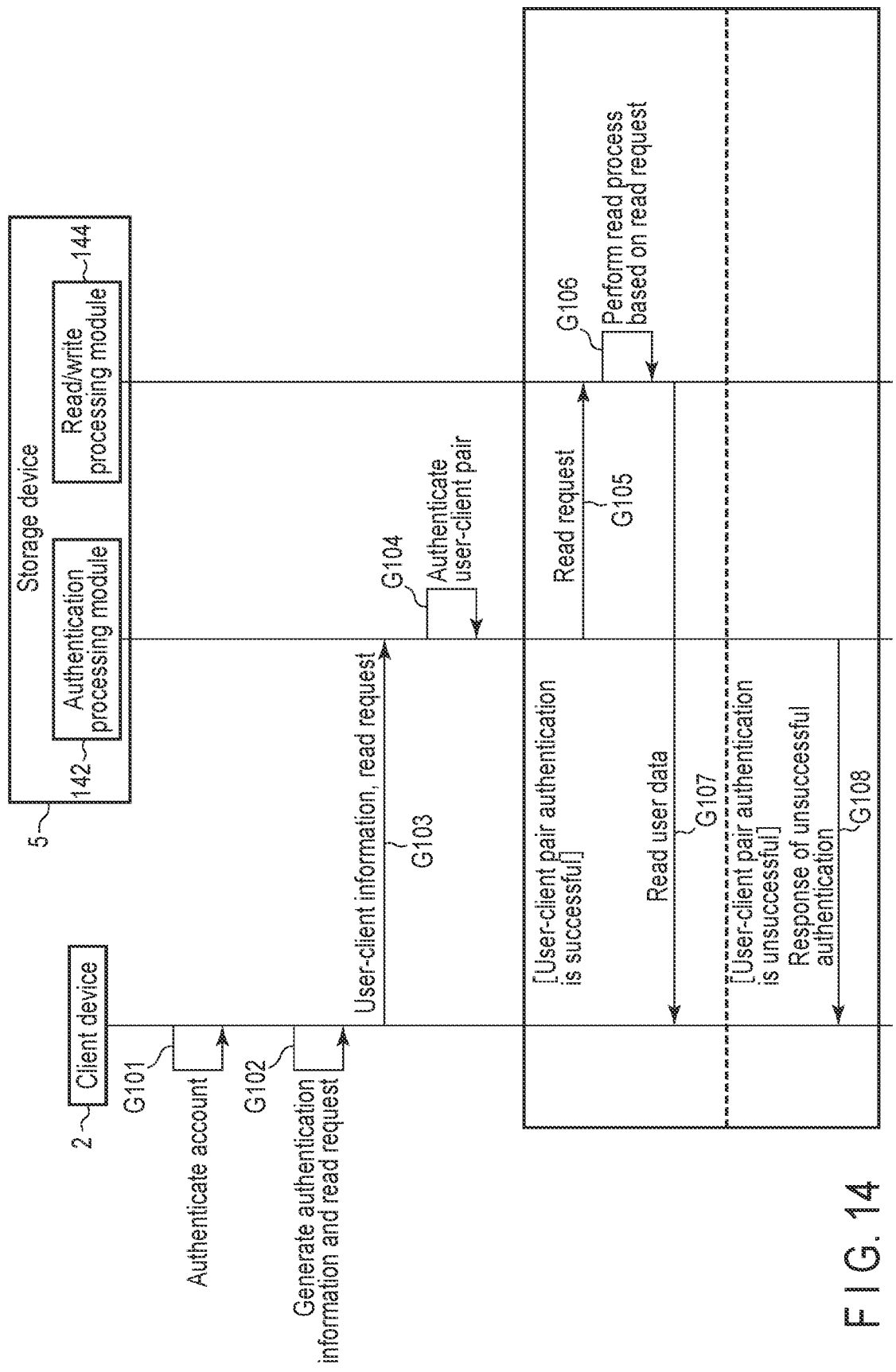
F I G. 14

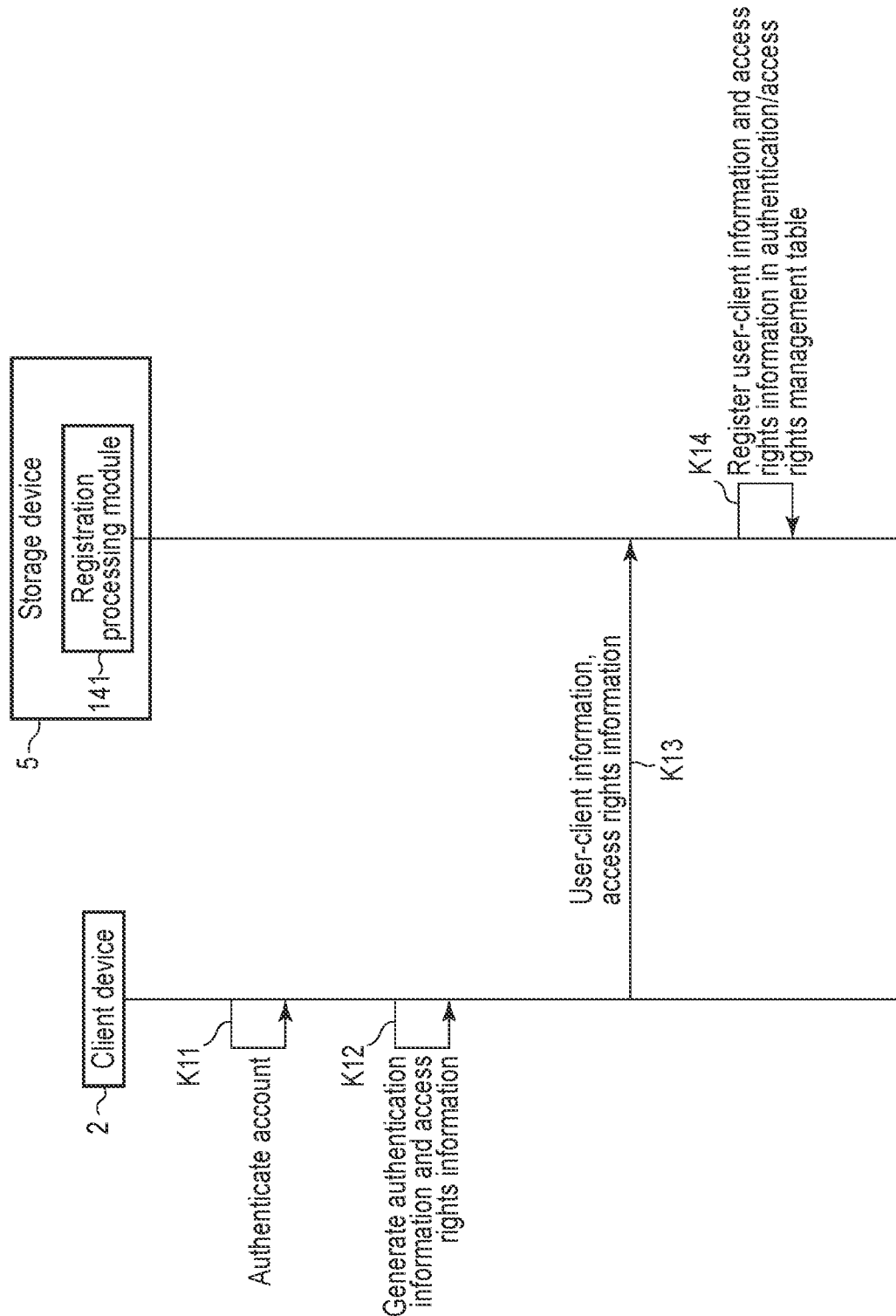
F I G. 16

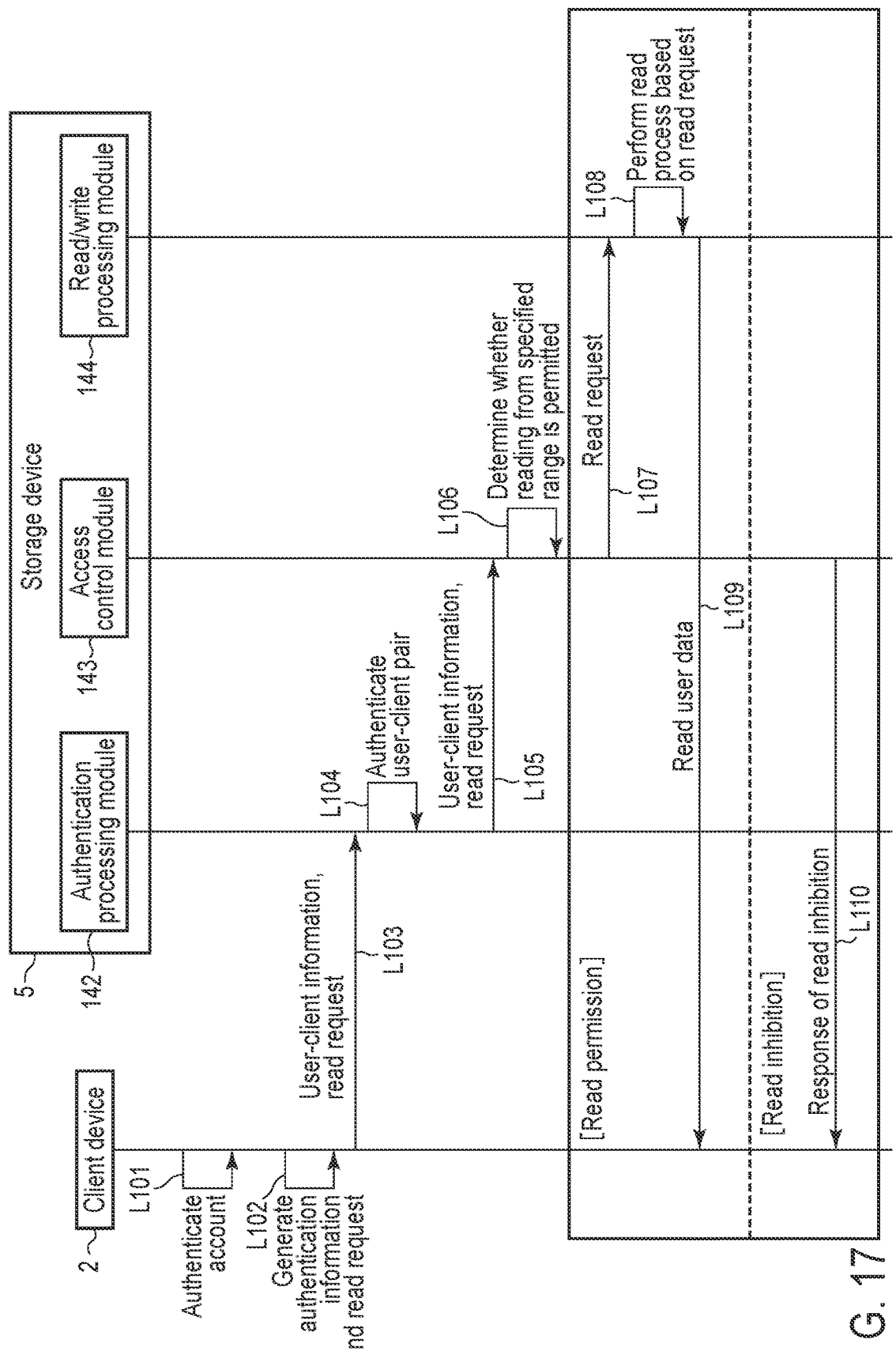
F I G. 17

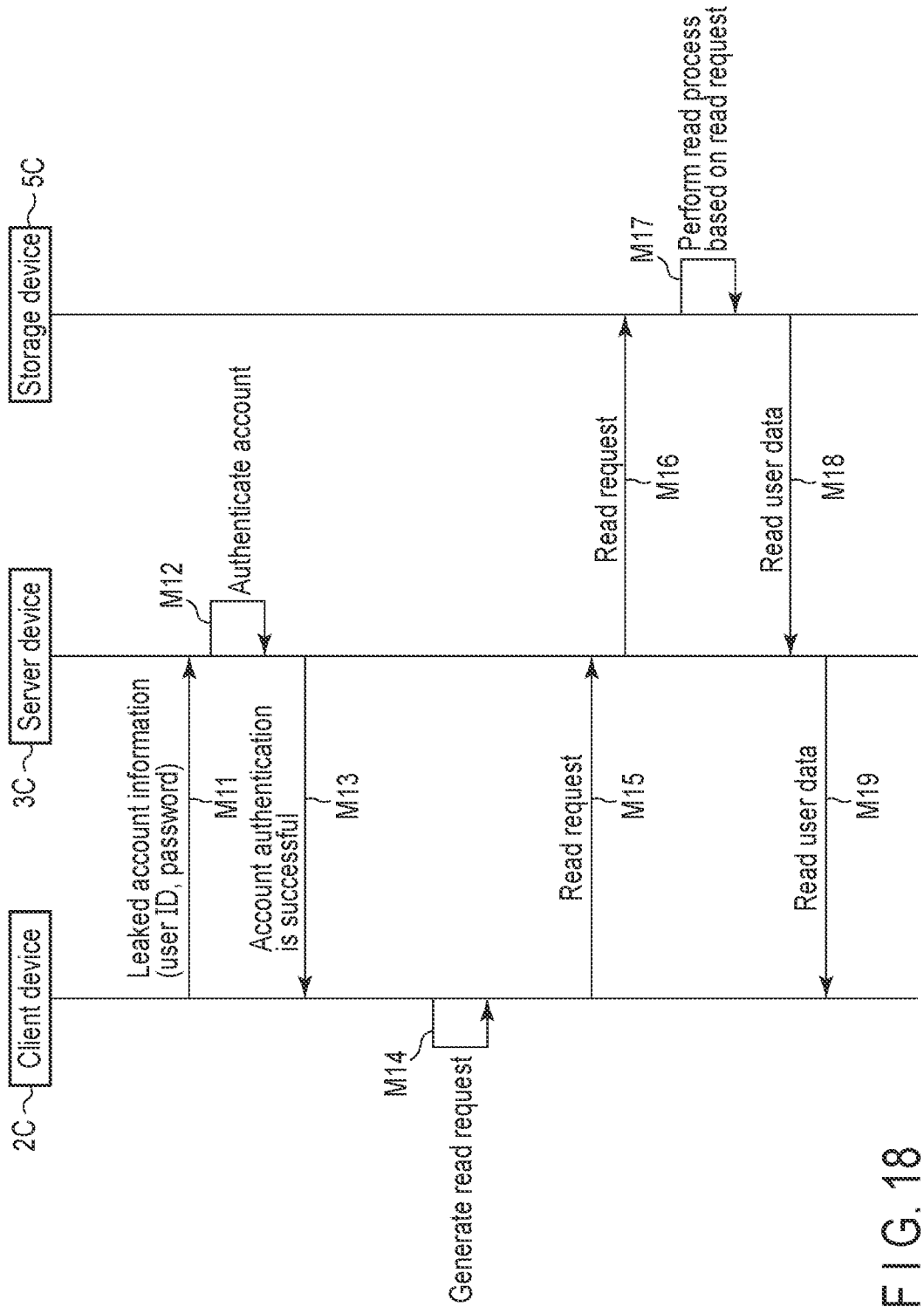
F I G. 18

STORAGE DEVICE

CROSS-REFERENCE TO RELATED APPLICATIONS

This application is based upon and claims the benefit of priority from Japanese Patent Application No. 2022-147216, filed Sep. 15, 2022, the entire contents of which are incorporated herein by reference.

FIELD

Embodiments described herein relate generally to technology for controlling a nonvolatile memory.

BACKGROUND

In recent years, storage devices including a nonvolatile memory are widely used. As one of such storage devices, a solid state drive (SSD) including a NAND flash memory is known. The SSD is used as a main storage for various computing devices.

A computing device issues, for example, account information to an account. The account is usually assigned to an authorized user who uses an electronic device, such as a personal computer (PC), smart phone, and a storage device etc., to access the computing device or a network via the computing device. The account may be called as a user account. The account information is information used to authenticate the account properly. For example, the account information includes identification information of a user and a password and is set in a storage area of the computing device. The computing device permits an account having legitimate account information to access the connected storage device.

However, in such an account authentication method, there is a possibility that the account information issued by the computing device may be leaked for some reason. Then, a third party who obtains the account information may access the storage device and perform unauthorized access to steal data or rewrite data in the storage device.

BRIEF DESCRIPTION OF THE DRAWINGS

FIG. 2 is a block diagram illustrating a configuration example of the storage device according to the first embodiment.

FIG. 3 illustrates a configuration example of an authentication/access rights management table that is used in the storage device according to the first embodiment.

FIG. 4 is a sequence diagram illustrating an example of registration processing between the storage device according to the first embodiment, the server device, and the client device.

FIG. 5 is a sequence diagram illustrating an example of authentication/read processing between the storage device according to the first embodiment, the server device, and the client device.

FIG. 6 is a sequence diagram illustrating an example of authentication/write processing between the storage device according to the first embodiment, the server device, and the client device.

FIG. 7 is a sequence diagram illustrating another example of the registration processing between the storage device according to the first embodiment, the server device, and the client device.

FIG. 8 is a sequence diagram illustrating another example of the authentication/read processing between the storage device according to the first embodiment, the server device, and the client device.

FIG. 10 is a flowchart illustrating an example of the procedure of authentication/access processing executed in the storage device according to the first embodiment.

FIG. 13 is a sequence diagram illustrating an example of registration processing between the storage device according to the second embodiment and the client device.

FIG. 14 is a sequence diagram illustrating an example of authentication/read processing between the storage device according to the second embodiment and the client device.

FIG. 16 is a sequence diagram illustrating another example of the registration processing between the storage device according to the second embodiment and the client device.

FIG. 17 is a sequence diagram illustrating another example of the authentication/read processing between the storage device according to the second embodiment and the client device.

FIG. 18 is a sequence diagram illustrating an example of authentication/read processing between a storage device according to a comparative example, a server device, and a client device.

DETAILED DESCRIPTION

Various embodiments will be described hereinafter with reference to the accompanying drawings.

In general, according to one embodiment, a storage device includes a nonvolatile memory and a controller. The controller is connected to the storage device. The controller manages first user identification information and first authentication information that includes a hash value calculated from the first user identification information and a first device identification information of a first client device. The controller receives an access request to the nonvolatile memory, user identification information, and authentication information that are transmitted from an external device, accepts the access request in a case where a first condition that the user identification information received matches the first user identification information, and the authentication information received matches the first authentication information, is satisfied, and rejects the access request in a case where the first condition is not satisfied.

First Embodiment

Figure 1:
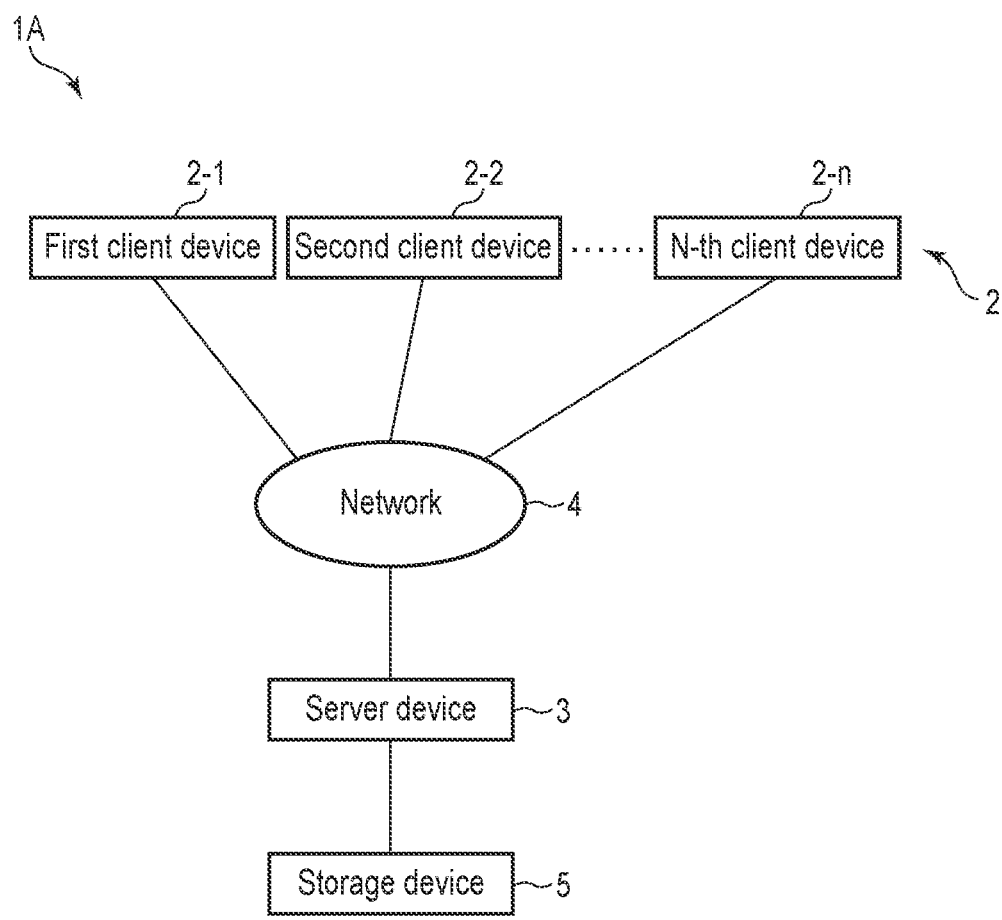
FIG. 1 is a block diagram illustrating an example of an overall configuration of an information processing system in which a storage device according to a first embodiment is connected to a client device via a server device and a network.

FIG. 1 is a block diagram illustrating an example of an overall configuration of an information processing system in which a storage device according to a first embodiment is connected to a client device via a server device and a network. An information processing system 1A includes, for example, multiple client devices 2, a server device 3, a network 4, and a storage device 5.

The client devices 2 are, for example, n client devices 2-1, 2-2, ..., and 2-$n$, where n is an integer of one or more. Each of the n client devices 2-1, 2-2, ..., and 2-$n$ is a computing device that accesses the storage device 5 via the network 4 and the server device 3. Each of the n client devices 2-1, 2-2, ..., and 2-$n$ is a personal computer or a smartphone, for example. Each of the n client devices 2-1, 2-2, ..., and 2-$n$ is used by at least one user. More specifically, for example, one of the n client devices 2-1, 2-2, ..., and 2-$n$ is used by only one user. Also, for example, another one of the n client devices 2-1, 2-2, ..., and 2-$n$ is used by multiple users. In the following description, one unspecified client device among the n client devices 2-1, 2-2, ..., and 2-$n$ may simply be referred to as the client device 2.

The server device 3 may be connected to the client device 2 via, for example, the network 4. The server device 3 authenticates an account of a user using the client device 2. In a case where the account authentication is successful, the server device 3 relays transfer of a request, a response, data, etc., between the client device 2 and the storage device 5. A request transmitted from the client device 2 to the storage device 5 via the server device 3 is, for example, an access request such as a write request and a read request. The access request enables the client device 2 to access at least a part of a storage area of the storage device 5.

The storage device 5 may be realized as, for example, a solid state drive (SSD) that includes a nonvolatile memory such as a NAND flash memory. The storage device 5 may be used as a storage (storage area) of the client device 2. The storage device 5 is connected to the server device 3 via a cable. Typically, it is assumed that a large amount of shared data is stored in the SSD as a database, and multiple users access the database from their respective client devices 2.

As interfaces for interconnecting the server device 3 and the storage device 5, SCSI, Serial Attached SCSI (SAS), ATA, Serial ATA (SATA), PCI Express™ (PCIe™), Ethernet™, Fibre channel, NVM Express™ (NVMe™), etc., may be used.

Next, an internal configuration of the storage device 5 will be described.

FIG. 2 is a block diagram illustrating a configuration example of the storage device 5 according to the first embodiment. The storage device 5 includes a nonvolatile memory 6, a random access memory (RAM) 7, and a controller 8.

The nonvolatile memory 6 is a memory device. The nonvolatile memory 6 may be a nonvolatile memory with a two-dimensional structure or a nonvolatile memory with a three-dimensional structure. The nonvolatile memory 6 is realized as a NAND flash memory, for example.

The nonvolatile memory 6 includes a memory cell array. The memory cell array includes multiple memory cells that are arranged in a matrix. The memory cell array of the nonvolatile memory 6 includes multiple blocks B0, B1, B2, ..., and Bm−1. The blocks B0, B1, B2, ..., and Bm−1 each include multiple pages P0, ..., and Pn−1. The blocks each function as the minimum unit of a data erase operation. The block may also be referred to as an erase block or a physical block. Each of the pages P0, ..., and Pn−1 includes memory cells connected to a single word line. The pages each functions as a unit of a data write operation and a data read operation. Note that a word line may function as a unit of a data write operation and a data read operation.

Also, the nonvolatile memory 6 may include multiple nonvolatile memory chips (e.g., multiple NAND flash memory dies).

The RAM 7 is a volatile memory. The RAM 7 is, for example, a dynamic RAM (DRAM). Alternatively, the RAM 7 may be a static RAM (SRAM). The RAM 7 may be an internal configuration of the controller 8. In the following, a case in which the DRAM is used as the RAM 7 is mainly exemplified.

The RAM 7 includes a cache area of a logical-to-physical address translation table 31 and a cache area of an authentication/access rights management table 32. The logical-to-physical address translation table 31 and the authentication/access rights management table 32 are, for example, loaded into the RAM 7 from the nonvolatile memory 6 while the storage device 5 is started up.

The logical-to-physical address translation table 31 is a table that manages mapping between each logical address and each physical address of the nonvolatile memory 6. The logical-to-physical address translation table 31 is realized, for example, as a look-up table (hereinafter sometimes referred to as an LUT). The logical address is an address used by the client device 2 for addressing the storage device 5. The logical address is, for example, a logical block address (hereinafter sometimes referred to as an LBA). The physical address indicates a memory location in the nonvolatile memory 6.

The authentication/access rights management table 32 is a table that manages (1) information used for authenticating a combination of a user and a client device 2 and (2) access rights of accessing to the nonvolatile memory 6 that are set for the combination of the user and the client device 2. A specific configuration example of the authentication/access rights management table 32 is described later with reference to FIG. 3. In the following, a combination of one user and one client device 2 is also referred to as a user-client pair. Information used for authenticating the user-client pair is also referred to as user-client information.

The controller 8 is a memory controller connected to the nonvolatile memory 6 and configured to control the nonvolatile memory 6. For example, the controller 8 may be realized by a circuit such as a system-on-a-chip (SoC).

The controller 8 may also function as a flash translation layer (FTL) configured to execute data management and block management of the nonvolatile memory 6.

The data management includes (1) management of mapping information that indicates relationship between each logical address and each physical address of the nonvolatile memory 6 and (2) processing to seemingly hide a difference between time required for read/write operations in units of page and time required for erase operations in units of block.

The block management includes management of defective blocks, wear leveling (WL), and garbage collection (GC). In the following, processing for data management and block management of the nonvolatile memory 6 is also referred to as FTL processing. The controller 8 executes management of the mapping between each logical address and each physical address by using the logical-to-physical address translation table 31 (or LUT 31). The controller 8 manages the mapping between each logical address and each physical address in a certain management size.

The tolerable maximum number of program/erase cycles (maximum number of P/E cycles) for each of the blocks is generally limited. One P/E cycle of a block includes a data erase operation to erase data stored in all memory cells in the block and a data write operation (data program operation) to write data in pages of the block. The data write operation into one page is executable only once in a single P/E cycle. Thus, the controller 8 writes updated data corresponding to a logical address not to an original physical memory location in which previous data corresponding to the logical address is stored but to a different physical memory location. Then, the controller 8 updates the logical-to-physical address translation table 31 to associate the logical address with this different physical memory location than the original physical memory location and to invalidate the previous data. Data to which the logical-to-physical address translation table 31 refers (that is, data associated with a logical address) will be referred to as valid data. Furthermore, data not associated with any logical address will be referred to as invalid data. The valid data is data to possibly be read by the client device 2 later. The invalid data is data not to be read by the client device 2 anymore.

The controller 8 includes a host interface (host I/F) 11, a memory interface (memory I/F) 12, a RAM interface (RAM I/F) 13, and a CPU 14. The host I/F 11, the memory I/F 12, the RAM I/F 13, and the CPU 14 are connected via, for example, a bus 10.

The host I/F 11 is a circuit that receives an access request and data from the server device 3. The received data is, for example, user data to be written into the nonvolatile memory 6 in accordance with a write request.

The host I/F 11 is also a circuit that transmits a response and data to the server device 3. The response is, for example, a response to an access request. The transmitted data is, for example, user data read from the nonvolatile memory 6 in accordance with a read request to read the data written into the nonvolatile memory 6.

The memory I/F 12 is a storage control circuit configured to control the nonvolatile memory 6. The memory I/F 12 conforms to interfaces such as a Toggle DDR and an Open NAND Flash Interface (ONFI). The controller 8 and the nonvolatile memory 6 are electrically connected via the memory I/F 12. The memory I/F 12 may also be connected to memory chips in the nonvolatile memory 6 via multiple channels. The RAM I/F 13 is a RAM controller configured to control access to the RAM 7.

The CPU 14 is a processor configured to control the host I/F 11, the memory I/F 12, and the RAM I/F 13. The CPU 14 performs various processing by executing control programs (firmware) stored in a ROM, etc., which is not illustrated. The various processing includes, for example, the FTL processing for data management and block management as described above, and request processing of read and write requests, etc. The operation of the CPU 14 is controlled by the firmware described above, which is executed by the CPU 14. Note that some or all of the FTL processing and the request processing may also be executed by dedicated hardware in the controller 8.

The CPU 14 may function as, for example, a registration processing module 141, an authentication processing module 142, an access control module 143, and a read/write processing module 144. The CPU 14 may execute, for example, firmware to function as the registration processing module 141, the authentication processing module 142, the access control module 143, and the read/write processing module 144. Specific processing of the registration processing module 141, the authentication processing module 142, the access control module 143, and the read/write processing module 144 is described later with reference to FIG. 4 to FIG. 8.

Next, with reference to FIG. 3, the authentication/access rights management table 32 used in the storage device 5 will be described.

FIG. 3 illustrates a configuration example of the authentication/access rights management table 32. The authentication/access rights management table 32 includes multiple entries. Each of the entries corresponds to one user-client pair. Each of the entries includes, for example, a user ID field, an authentication information field, and multiple access right fields. In each of the entries, data set in the user ID field, data set in the authentication information field, and data set in the access right fields are associated and managed.

In an entry corresponding to a user-client pair, the user ID field indicates identification information assigned to a corresponding user. The corresponding user is a user of the user-client pair. The identification information assigned to a user is also referred to as a user ID. The user ID is information capable of uniquely identifying the corresponding user.

The authentication information field indicates authentication information for the user-client pair. The authentication information is information that is unique to the user-client pair. The authentication information includes, for example, a hash value calculated from data corresponding to the user-client pair. The data corresponding to the user-client pair is composed of a user ID of the corresponding user and unique identification information of the corresponding client device 2. The corresponding client device 2 is a client device 2 of the user-client pair. The unique identification information of the client device 2 is also referred to as a device ID. A specific hash algorithm is used to calculate the hash value. The specific hash algorithm is, for example, Secure Hash Algorithm (SHA), typically including SHA-384 and SHA-512.

The access right fields are, for example, m access right fields, where m is an integer of one or more. Each of the m access right fields corresponds to at least a part of the storage area of the nonvolatile memory 6. The at least a part of the storage area of the nonvolatile memory 6 is represented, for example, by one LBA range. The LBA range includes at least one LBA. The LBA range is identified by, for example, a starting LBA address of the LBA range and the number of logical blocks or data size. In the following, a case in which each of the m access right fields corresponds to one LBA range is exemplified. Note that the at least a part of the storage area of the nonvolatile memory 6 may also be represented by any unit of storage area not limited to the LBA range.

Each of the m access right fields indicates an access right to the corresponding LBA range that is set for the user-client pair. For example, each of the access right fields in a first column of FIG. 3 indicates an access right to a first LBA range set for a user-client pair. The access right indicates whether access is permitted or inhibited. Specifically, the access right is represented by, for example, at least one of "R", "W", and "-". "R" indicates that reading of user data from the corresponding LBA range is permitted (i.e., read permission). "W" indicates that writing of user data into the corresponding LBA range is permitted (i.e., write permission). "-" indicates that access to the corresponding LBA range is inhibited (i.e., access inhibition).

In the example illustrated in FIG. 3, the authentication/access rights management table 32 is configured to contain multiple entries, where, from the top, four entries of a first entry 321, a second entry 322, a third entry 323, and a fourth entry 324 are shown.

The first entry 321, for example, corresponds to a pair of a first user and the first client device 2-1. In the first entry 321, the user ID field indicates a user ID "User01" of the first user. The authentication information field indicates a hash value of data that is composed of the user ID "User01" and a device ID of the first client device 2-1. The access right field corresponding to the first LBA range indicates that the pair of the first user and the first client device 2-1 is permitted to read from the first LBA range. The access right field corresponding to a second LBA range indicates that the pair of the first user and the first client device 2-1 is permitted to read from the second LBA range. The access right field corresponding to an m-th LBA range indicates that the pair of the first user and the first client device 2-1 is permitted to read from the m-th LBA range.

The second entry 322, for example, corresponds to a pair of the first user and the second client device 2-2. In the second entry 322, the user ID field indicates the user ID "User01" of the first user. The authentication information field indicates a hash value of data that is composed of the user ID "User01" and a device ID of the second client device 2-2. The access right field corresponding to the first LBA range indicates that the pair of the first user and the second client device 2-2 is permitted to read from and write into the first LBA range. The access right field corresponding to the second LBA range indicates that the pair of the first user and the second client device 2-2 is permitted to read from and write into the second LBA range. The access right field corresponding to the m-th LBA range indicates that the pair of the first user and the second client device 2-2 is permitted to read from and write into the m-th LBA range.

In the first entry 321 and the second entry 322, although the corresponding user is the same, the corresponding client devices 2 are different. In a case where the same user uses multiple client devices 2, for example, an access right to an LBA range may be set differently depending on the client device 2 to be used. Note that, in the case where the same user uses multiple client devices 2, the access right to the LBA range may also be set the same regardless of the client device 2 to be used.

The third entry 323, for example, corresponds to a pair of a second user and the first client device 2-1. In the third entry 323, the user ID field indicates a user ID "User02" of the second user. The authentication information field indicates a hash value of data that is composed of the user ID "User02" and the device ID of the first client device 2-1. The access right field corresponding to the first LBA range indicates that the pair of the second user and the first client device 2-1 is permitted to read from and write into the first LBA range. The access right field corresponding to the second LBA range indicates that the pair of the second user and the first client device 2-1 is permitted to read from the second LBA range. The access right field corresponding to the m-th LBA range indicates that the pair of the second user and the first client device 2-1 is permitted to read from and write into the m-th LBA range.

In the first entry 321 and the third entry 323, although the corresponding users are different, the corresponding client device 2 is the same client device 2-1. In a case where multiple users use one client device 2, an access right to an LBA range may be set the same regardless of the user. Note that, in the case where the multiple users use one client device 2, the access right to the LBA range may also be set differently depending on the user.

The fourth entry 324, for example, corresponds to a pair of a third user and the n-th client device 2-n. In the fourth entry 324, the user ID field indicates a user ID "User03" of the third user. The authentication information field indicates a hash value of data that is composed of the user ID "User03" and a device ID of the n-th client device 2-n. The access right field corresponding to the first LBA range indicates that the pair of the third user and the n-th client device 2-n is permitted to read from and write into the first LBA range. The access right field corresponding to the second LBA range indicates that the pair of the third user and the n-th client device 2-n is permitted to read from and write into the second LBA range. The access right field corresponding to the m-th LBA range indicates that the pair of the third user and the n-th client device 2-n is inhibited to access the m-th LBA range.

With the above configuration, the information (user-client information) used for authentication of each of the user-client pairs and the access rights to the respective LBA ranges that are set for each of the user-client pairs can be managed by using the authentication/access rights management table 32.

Next, each processing operated in the information processing system 1A will be described with reference to FIG. 4 to FIG. 8.

FIG. 4 is a sequence diagram illustrating an example of registration processing between the storage device 5 according to the first embodiment, the server device 3, and the client device 2. The registration processing is processing of registering the user-client information to the storage device 5. The user-client information includes, for example, a user ID and authentication information.

First, the client device 2 transmits account information of the user using the client device 2, to the server device 3 (A11). The account information includes, for example, a user ID and a password. The user ID and the password are input, for example, by an input device provided with the client device 2, based on an operation by the user. The input device is, for example, a keyboard or a touch screen display.

The server device 3 authenticates the account on the basis of the account information received from the client device 2 (hereinafter referred to as the received account information) (A12). More specifically, the server device 3 determines whether or not at least one piece of account information stored and set in advance (hereinafter referred to as set account information) includes account information that matches the received account information. In a case where there is set account information that includes a user ID that matches the user ID in the received account information and includes a password that matches the password in the received account information, the server device 3 determines that the account authentication is successful. In a case where there is no set account information that includes a user ID that matches the user ID in the received account information, the server device 3 determines that the account authentication is not successful. Furthermore, in a case where there is set account information that includes a user ID that matches the user ID in the received account information but includes a password that is different from the password in the received account information, the server device 3 determines that the account authentication is not successful. In the case where the account authentication is not successful, the user-client information is not registered to the storage device 5.

Registration of the user-client information to the storage device 5 is performed in a case where the account authentication is successful. The following describes the case in which the account authentication is successful. In the case where the account authentication is successful, the server device 3 notifies the client device 2 that the account authentication is successful (A13).

After being notified by the server device 3 that the account authentication is successful, the client device 2 generates authentication information (A14). Specifically, the client device 2 generates, as the authentication information, a hash value calculated from data that is composed of the user ID and the device ID of the client device 2. That is, the client device 2 calculates the hash value from the data. Then, the client device 2 transmits user-client information that includes the user ID and the generated authentication information, to the server device 3 (A15).

When having received the user-client information from the client device 2, the server device 3 transmits the received user-client information to the storage device 5 (A16).

When having received the user-client information from the server device 3, the registration processing module 141 of the storage device 5 registers the received user-client information in the authentication/access rights management table 32 (A17). Specifically, the registration processing module 141 extracts the user ID and the authentication information from the received user-client information. Then, the registration processing module 141 adds an entry including the extracted user ID and authentication information to the authentication/access rights management table 32.

Through the registration processing described above, user-client information corresponding to a pair (user-client pair) of the client device 2 and a user using the client device 2 can be registered to the storage device 5. This enables the storage device 5 to authenticate the user-client pair by using the authentication/access rights management table 32. Since user-client pair authentication is performed in the storage device 5 separately from the account authentication performed in the server device 3, the security of access to the nonvolatile memory 6 can be enhanced. In addition, since the storage device 5 manages the user-client information corresponding to the user-client pair, in a case where a user uses multiple client devices 2, the server device 3 does not need to issue and set multiple pieces of account information for the user that correspond to the client devices 2 to be used, respectively. Note that, in order to prevent false user-client information from being registered by a malicious user, the client device 2 may add to the user-client information to be transmitted information that can verify the legitimacy.

FIG. 5 is a sequence diagram illustrating an example of authentication/read processing between the storage device 5 according to the first embodiment, the server device 3, and the client device 2. The authentication/read processing is processing of authenticating a user-client pair and performing read processing. The authentication/read processing is performed in a case where the client device 2 requests to read user data from the storage device 5.

The processing related to account authentication from B101 to B103 is the similar as the processing from A11 to A13 described above with reference to FIG. 4. Note that, in a case where the account authentication has been performed before the authentication/read processing is started and the authentication is successful, the processing from B101 to B103 may be omitted.

After being notified by the server device 3 that account authentication is successful, the client device 2 generates authentication information and a read request (B104). The read request specifies an LBA range corresponding to a file that the client device 2 intends to read. The specified LBA range indicates a storage area in the storage device 5 where the file is logically stored. The relationship between the file and the LBA range is managed, for example, by a file system. The file system is included, for example, in an operating system executed by the client device 2. The client device 2 transmits user-client information including the user ID and the generated authentication information, and the generated read request to the server device 3 (B105).

When having received the user-client information and the read request from the client device 2, the server device 3 transmits the received user-client information and read request to the storage device 5 (B106).

When having received the user-client information and the read request from the server device 3, the authentication processing module 142 of the storage device 5 authenticates the user-client pair based on the received user-client information by using the authentication/access rights management table 32 (B107). Specifically, the authentication processing module 142 determines whether or not one of the entries in the authentication/access rights management table 32 is an entry that satisfies a condition that (1) the entry includes a user ID that matches the user ID in the received user-client information and (2) the entry includes authentication information that matches the authentication information in the received user-client information. In a case where one of the entries in the authentication/access rights management table 32 satisfies the condition, the authentication processing module 142 determines that the authentication of the user-client pair is successful. The authentication processing module 142 then accepts the received read request. In a case where none of the entries in the authentication/access rights management table 32 satisfy the condition, the authentication processing module 142 determines that the authentication of the user-client pair is not successful. The authentication processing module 142 then rejects the received read request.

A case where processing in the authentication of the user-client pair (B107) is successful will be described.

The authentication processing module 142 sends the received read request to the read/write processing module 144 (B108).

When having received the read request from the authentication processing module 142, the read/write processing module 144 performs read processing for the nonvolatile memory 6, based on the read request (B109). Specifically, the read/write processing module 144 identifies a physical address corresponding to the LBA range specified in the read request by using the logical-to-physical address translation table 31. The read/write processing module 144 reads user data from the nonvolatile memory 6, based on the identified physical address. Then, the read/write processing unit 144 transmits the read user data to the server device 3 (B110).

When having received the user data from the storage device 5, the server device 3 transmits the received user data to the client device 2 (B111).

Thus, the client device 2 can obtain the user data requested to be read with the read request.

Next, a case where processing in the authentication of the user-client pair (B107) is not successful will be described.

The authentication processing module 142 transmits a response indicating that the authentication of the user-client pair is not successful to the server device 3 (B112). Note that the authentication processing module 142 may transmit a response indicating that read processing based on the read request has failed to the server device 3.

The server device 3 further transmits the response received from the storage device 5, to the client device 2 (B113).

Thus, the client device 2 can recognize that the authentication of the user-client pair has failed or that the read processing based on the read request has failed.

Through the authentication/read processing described above, the storage device 5 authenticates the user-client pair and, in the case where the authentication is successful, can perform read processing based on the read request. In a case where the storage device 5 receives a read request together with user-client information that is not registered in the authentication/access rights management table 32, read processing based on the read request is not performed. In other words, the storage device 5 rejects a read request from a user-client pair that does not have legitimate user-client information. This enables the storage device 5 to enhance the security of access to the nonvolatile memory 6.

FIG. 6 is a sequence diagram illustrating an example of authentication/write processing between the storage device 5 according to the first embodiment, the server device 3, and the client device 2. The authentication/write processing is processing of authenticating a user-client pair and performing write processing. The authentication/write processing is performed in a case where the client device 2 requests to write user data into the storage device 5.

The processing related to account authentication from C101 to C103 is essentially the similar as the processing from A11 to A13 described above with reference to FIG. 4.

After being notified by the server device 3 that account authentication is successful, the client device 2 generates authentication information and a write request (C104). The write request specifies an LBA range corresponding to a file that the client device 2 intends to write user data. The specified LBA range indicates a storage area in the storage device 5 where the file is logically stored. The client device 2 transmits user-client information including the user ID and the generated authentication information, the generated write request, and the user data to be written, to the server device 3 (C105).

When having received the user-client information, the write request, and the user data from the client device 2, the server device 3 transmits the received user-client information, the write request, and the user data to the storage device 5 (C106).

When having received the user-client information, the write request, and the user data from the server device 3, the authentication processing module 142 of the storage device 5 authenticates the user-client pair based on the received user-client information by using the authentication/access rights management table 32 (C107).

Processing in a case where the authentication of the user-client pair is successful in C107 will be described.

The authentication processing module 142 sends the received write request and user data to the read/write processing module 144 (C108).

When having received the write request and the user data from the authentication processing module 142, the read/write processing module 144 performs write processing for the nonvolatile memory 6, based on the write request (C109). Specifically, the storage device 5 writes the received user data into the nonvolatile memory 6. The storage device 5 updates the logical-to-physical address translation table 31 to indicate mapping between a physical address indicative of a memory location where the user data has been written and the LBA range specified in the write request. Then, the storage device 5 transmits a response indicating that the write processing based on the write request has been completed to the server device 3 (C110).

The server device 3 further transmits the response received from the storage device 5, to the client device 2 (C111).

Thus, the client device 2 recognizes that the write processing based on the write request has been completed.

Next, processing in a case where the authentication of the user-client pair is not successful in C107 will be described.

The authentication processing unit 142 transmits a response indicating that the authentication of the user-client pair is not successful to the server device 3 (C112). Note that the storage device 5 may transmit a response indicating that the write processing based on the write request has failed to the server device 3.

The server device 3 further transmits the response received from the storage device 5 to the client device 2 (C113).

Thus, the client device 2 recognizes that the authentication of the user-client pair has failed or that the write processing based on the write request has failed.

Through the authentication/write processing described above, the storage device 5 authenticates the user-client pair and, in the case where the authentication is successful, can perform write processing based on the write request. In a case where the storage device 5 receives a write request together with user-client information that is not registered in the authentication/access rights management table 32, write processing based on the write request is not performed. In other words, the storage device 5 rejects a write request from a user-client pair that does not have legitimate user-client information. This enables the storage device 5 to enhance the security of access to the nonvolatile memory 6.

FIG. 7 is a sequence diagram illustrating another example of the registration processing between the storage device 5 according to the first embodiment, the server device 3, and the client device 2. The registration processing illustrated in FIG. 7 is processing of registering access rights information in addition to user-client information to the storage device 5.

The access rights information is information that indicates an access right to at least one LBA range, and, for example, corresponds to information included in the access right field of the table 32 illustrated in FIG. 3. More specifically, the access rights information includes, for example, information indicative of an LBA range and information indicative of the content of an access right to the LBA range. The information indicating an LBA range is information that indicates, for example, an address of a starting LBA of the LBA range, and the number of logical blocks or data size. The information indicating the content of access right to the LBA range includes information indicating whether access to the LBA range is permitted or inhibited. For example, as in the example illustrated in FIG. 3, the information indicating the content of access rights to the LBA range includes at least one of read permission "R", write permission "W", and access inhibition "-". The access right information corresponds to a user-client pair indicated by the user-client information. That is, the access right indicated by the access rights information is an access right set for the user-client pair indicated by the user-client information.

Processing related to account authentication from D11 to D13 is the similar as the processing from A11 to A13 described above with reference to FIG. 4.

After being notified by the server device 3 that the account authentication is successful, the client device 2 generates authentication information and access rights information (D14). Then, the client device 2 transmits user-client information including the user ID and the generated authentication information, and the generated access rights information to the server device 3 (D15).

When having received the user-client information and the access rights information from the client device 2, the server device 3 transmits the received user-client information and access rights information to the storage device 5 (D16).

When having received the user-client information and the access rights information from the server device 3, the registration processing module 141 of the storage device 5 registers the received user-client information and access rights information in the authentication/access rights management table 32 (D17). Specifically, the registration processing module 141 extracts the user ID and the authentication information from the received user-client information. The registration processing module 141 also extracts the content of an access right to at least one LBA range from the received access rights information. Then, the storage device 5 adds an entry including the extracted user ID, authentication information, and content of the access right to at least one LBA range, to the authentication/access right management table 32.

Through the registration processing described above, user-client information corresponding to a pair (user-client pair) of a client device 2 and a user using the client device 2, and access rights information corresponding to the user-client pair can be registered to the storage device 5. This enables the storage device 5 to authenticate the user-client pair by using the authentication/access rights management table 32. In addition, the storage device 5 can control access to the nonvolatile memory 6 by the user-client pair that has been successfully authenticated, for example, for each LBA range by using the authentication/access rights management table 32. Thus, the storage device 5 can enhance the security of access to the nonvolatile memory 6.

FIG. 8 is a sequence diagram illustrating another example of the authentication/read processing between the storage device 5 according to the first embodiment, the server device 3, and the client device 2.

Processing from E101 to E107 is the similar as the processing from B101 to B107 described above with reference to FIG. 5. Furthermore, the processing in a case where the authentication of the user-client pair is not successful in E107 is the similar as the processing in B112 and B113 described above with reference to FIG. 5.

The following describes processing in a case where the authentication of the user-client pair is successful in E107.

The authentication processing module 142 of the storage device 5 sends the received user-client information and read request to the access control module 143 (E108).

When having received the user-client information and the read request from the authentication processing module 142, the access control module 143 determines whether or not the user-client pair is permitted to read from an LBA range, which is specified in the read request, by using the authentication/access rights management table 32 (E109). Specifically, for example, the access control module 143 identifies an entry in the authentication/access rights management table 32 that corresponds to the received user-client information. The access control module 143 determines whether or not the identified entry indicates read permission "R" for the LBA range specified in the received read request. When the identified entry indicates read permission "R" for the LBA range specified in the read request, the access control module 143 determines that the user-client pair is permitted to read from the LBA range specified in the read request. The access control module 143 then accepts the read request. When the identified entry does not indicate read permission "R" for the LBA range specified in the read request, the access control module 143 determines that the user-client pair is not permitted (i.e., is inhibited) to read from the LBA range specified in the read request. The access control module 143 then rejects the read request.

A case where the user-client pair is permitted to read from the LBA range specified in the read request will be described.

In this case, the access control module 143 sends the read request to the read/write processing module 144 (E110).

When having received the read request from the access control module 143, the read/write processing module 144 performs read processing on the nonvolatile memory 6, based on the read request (E111). Then, the read/write processing module 144 transmits the read user data to the server device 3 (E112).

When having received the user data from the storage device 5, the server device 3 transmits the received user data to the client device 2 (E113).

Thus, the client device 2 can obtain the user data requested to be read with the read request.

Next, a case where the user-client pair is not permitted to read from the LBA range specified in the read request will be described.

In this case, the access control module 143 transmits a response indicating that reading from the LBA range specified in the read request is inhibited to the server device 3 (E114). Note that the access control module 143 may transmit a response indicating that the read processing based on the read request has failed to the server device 3.

The server device 3 further transmits the response received from the storage device 5 to the client device 2 (E115).

Thus, the client device 2 recognizes that reading from the LBA range specified in the read request is inhibited or that the read processing based on the read request has failed.

Through the authentication/read processing described above, the storage device 5 authenticates the user-client pair and, in the case where the authentication is successful and reading from the LBA range specified in the read request is permitted, can perform read processing based on the read request. If the storage device 5 receives a read request together with user-client information that is not registered in the authentication/access rights management table 32, read processing based on the read request is not performed. In other words, the storage device 5 rejects a read request from a user-client pair that do not have legitimate user-client information. Furthermore, if the storage device 5 receives a read request that specifies an LBA range for which reading is not permitted, read processing based on the read request is not performed. In other words, the storage device 5 rejects the read request even from a user-client pair that has legitimate user-client information if the read request specifies an LBA range for which reading is not permitted.

Note that, in the same manner, also in the authentication/write processing, the storage device 5 can perform write processing based only on a write request that specifies an LBA range for which writing is permitted. In other words, the storage device 5 rejects a write request that specifies an LBA range for which writing is not permitted.

Thus, the storage device 5 can enhance the security of access to the nonvolatile memory 6.

Next, with reference to FIG. 9 to FIG. 11, the procedure of processes executed in the storage device 5 will be described.

Figure 9:
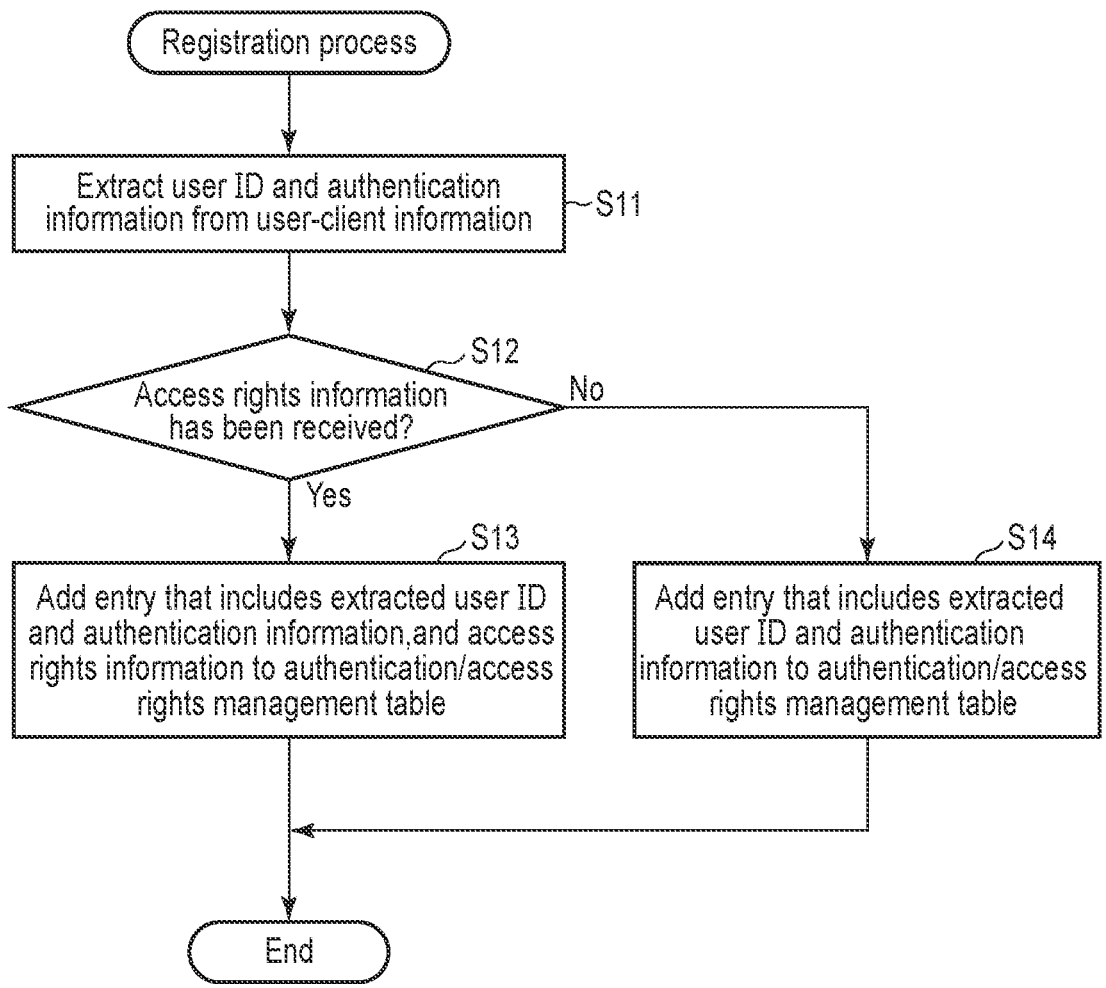
FIG. 9 is a flowchart illustrating an example of the procedure of the registration processing executed in the storage device according to the first embodiment.

FIG. 9 is a flowchart illustrating an example of the procedure of the registration processing executed in the storage device 5 according to the first embodiment. The registration processing is processing of registering user-client information to the storage device 5. In the registration processing, user-client information, or user-client information and access rights information, are registered in the storage device 5. When having received user-client information from the server device 3 or having received user-client information and access rights information from the server device 3, the CPU 14 of the storage device 5 executes the registration processing.

First, the CPU 14 extract a user ID and authentication information from the received user-client information (S11). Then, the CPU 14 determines whether or not access rights information is received along with the user-client information (S12).

When access rights information has been received (S12, Yes), the CPU 14 adds an entry that includes the extracted user ID and authentication information and the access rights information to the authentication/access rights management table 32 (S13) and ends the registration processing (End).

When access rights information is not received (S12, No), the CPU 14 adds an entry that includes the extracted user ID and authentication information to the authentication/access rights management table 32 (S14) and ends the registration processing (End).

Through the above registration processing, when having received user-client information from the server device 3, the CPU 14 can register the user-client information (i.e., the user ID and the authentication information) in the authentication/access rights management table 32. Therefore, the CPU 14 can manage the user-client information with the authentication/access rights management table 32.

Furthermore, when having received user-client information and access rights information from the server device 3, the CPU 14 can register the user-client information and the access rights information in the authentication/access rights management table 32. Therefore, the CPU 14 can manage the user-client information and the access rights information with the authentication/access rights management table 32.

FIG. 10 is a flowchart illustrating an example of the procedure of the authentication/access processing executed in the storage device 5 according to the first embodiment. The authentication/access processing is processing for authenticating a user-client pair and performing processing based on an access request in a case where the authentication is successful. When having received user-client information and an access request from the server device 3, the CPU 14 of the storage device 5 executes the authentication/access processing. Here, a case where the received access request is either a read request or a write request is exemplified. Note that, in the case where the access request is a write request, the CPU 14 receives user data to be written into the nonvolatile memory 6, along with the user-client information and the write request.

First, the CPU 14 extracts a user ID and authentication information from the received user-client information (S201). Then, the CPU 14 determines whether or not the authentication/access rights management table 32 includes an entry containing the extracted user ID (S202). Hereinafter, the entry containing the extracted user ID is referred to as a target entry.

In a case where the authentication/access rights management table 32 does not include a target entry (S202, No), the CPU 14 transmits a response indicative of unsuccessful authentication to the server device 3 (S203) and ends the authentication/access processing (End). Note that the fact that the authentication/access rights management table 32 does not include a target entry corresponds to unsuccessful authentication of the user-client pair.

In a case where the authentication/access rights management table 32 includes a target entry (S202, Yes), the CPU 14 determines whether or not the extracted authentication information matches the authentication information in the target entry (S204).

In a case where the extracted authentication information is different from the authentication information in the target entry (S204, No), the CPU 14 transmits a response indicating unsuccessful authentication to the server device 3 (S203) and ends the authentication/access processing (End). Note that the fact that the authentication/access rights management table 32 includes a target entry and the extracted authentication information is different from the authentication information in the target entry corresponds to unsuccessful authentication of the user-client pair.

In a case where the extracted authentication information matches the authentication information in the target entry (S204, Yes), the CPU 14 determines whether or not the received access request is a read request (S205). Note that the fact that the authentication/access rights management table 32 includes a target entry and the extracted authentication information matches the authentication information in the target entry corresponds to successful authentication of the user-client pair.

In a case where the received access request is a read request (S205, Yes), the CPU 14 identifies a physical address corresponding to an LBA range specified in the read request by using the logical-to-physical address translation table 31 (S206). The CPU 14 reads user data from the nonvolatile memory 6, based on the identified physical address (S207). The CPU 14 then transmits the read user data to the server device 3 (S208) and ends the authentication/access processing (End). Note that the CPU 14 may transmit a response indicating that the reading based on the read request has been completed to the server device 3, along with the read user data.

In a case where the received access request is not a read request (S205, No), that is, in a case where the received access request is a write request, the CPU 14 writes the user data into the nonvolatile memory 6, based on the write request (S209). The CPU 14 updates the logical-to-physical address translation table 31 to indicate mapping between a physical address indicating a memory location where the user data has been written and an LBA range specified in the write request (S210). Then, the CPU 14 transmits a response indicating that the writing based on the write request has been completed to the server device 3 (S211) and ends the authentication/access processing (End).

Through the authentication/access processing described above, the CPU 14 can perform control so that the processing based on the access request is executed in the case where the authentication of the user-client pair is successful. In other words, the CPU 14 can perform control so that the processing based on the access request is not executed in the case where the authentication of the user-client pair is unsuccessful. Thus, the CPU 14 can enhance the security of access to the nonvolatile memory 6.

Note that the procedure from S205 to S211 of the authentication/access processing may be replaced with access control processing. The access control processing controls execution of processing based on an access request, depending on whether or not the user-client pair is permitted to access an LBA range specified in the access request.

Figure 11:
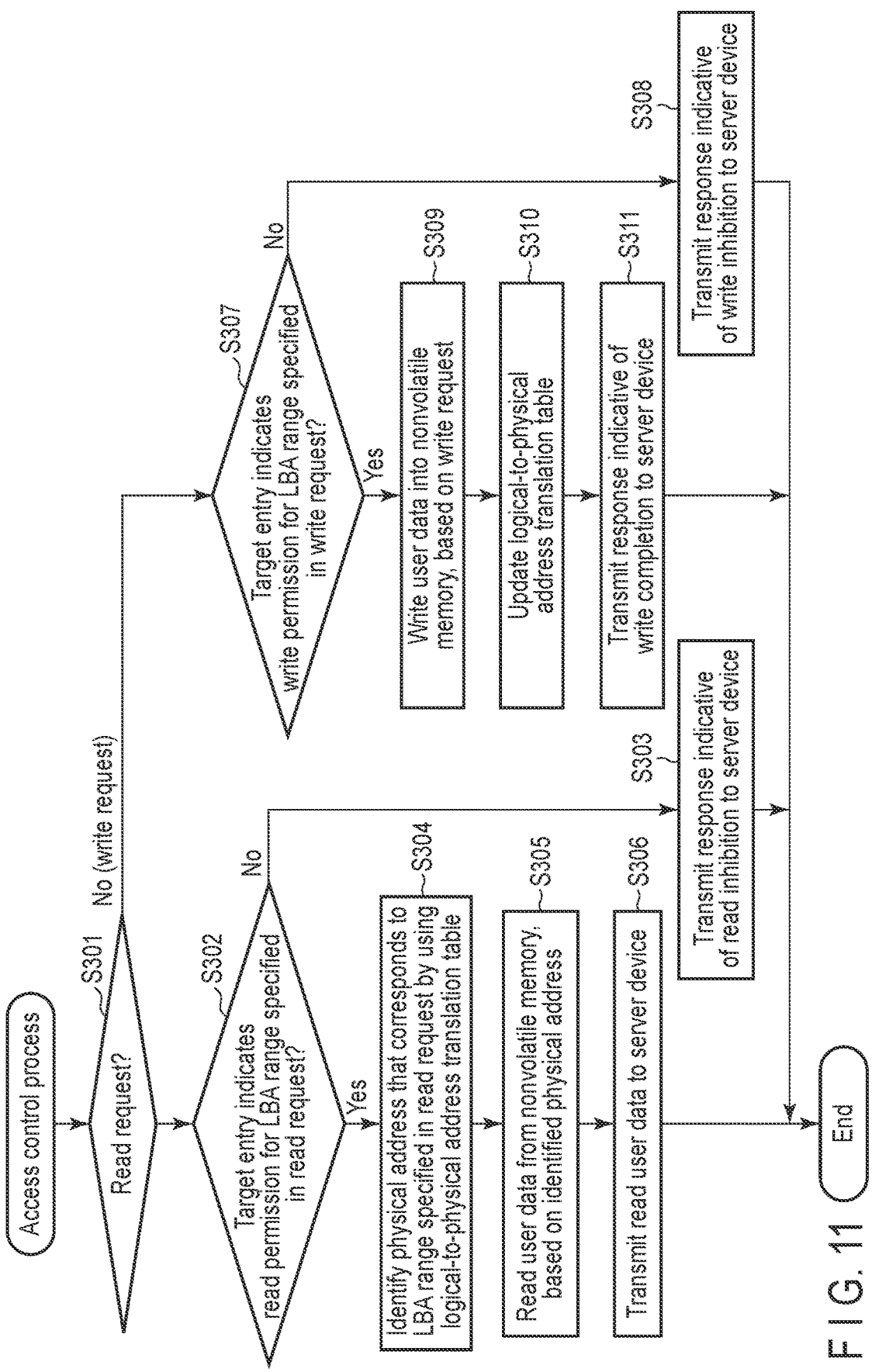
FIG. 11 is a flowchart illustrating an example of the procedure of access control processing executed in the storage device according to the first embodiment.

FIG. 11 is a flowchart illustrating an example of the procedure of the access control processing executed in the storage device 5 according to the first embodiment. The CPU 14 executes the access control processing in a case where the extracted authentication information matches the authentication information of the target entry in S204 of the authentication/access processing described above with reference to FIG. 10. Note that the extracted authentication information is the authentication information extracted from the received user-client information. The target entry is an entry in the authentication/access rights management table 32 that includes the user ID extracted from the received user-client information.

First, the CPU 14 determines whether or not the received access request is a read request (S301).

In a case where the received access request is a read request (S301, Yes), the CPU 14 determines whether or not the target entry indicates read permission for the LBA range specified in the read request (S302).

In a case where the target entry does not indicate read permission for the LBA range specified in the read request (S302, No), the CPU 14 transmits a response indicating that reading from the specified LBA range is inhibited to the server device 3 (S303) and ends the access control processing (End).

In a case where the target entry indicates read permission for the LBA range specified in the read request (S302, Yes), the CPU 14 performs the procedure from S304 to S306 and ends the access control processing (End). Since the procedure from S304 to S306 are the similar as the procedure from S206 to S208 of the authentication/access processing described above, detailed explanations are omitted.

In a case where the received access request is a write request (S301, No), the CPU 14 determines whether or not the target entry indicates write permission for the LBA range specified in the write request (S307).

In a case where the target entry does not indicate write permission for the LBA range specified in the write request (S307, No), the CPU 14 transmits a response indicating that writing into the specified LBA range is inhibited to the server device 3 (S308) and ends the access control processing (End).

In a case where the target entry indicates write permission for the LBA range specified in the write request (S307, Yes), the CPU 14 performs the procedure from S309 to S311 and ends the access control processing (End). The procedure from S309 to S311 are the similar as the procedure from S209 to S211 of the authentication/access processing described above.

Through the access control processing described above, the CPU 14 can perform control so that processing based on the access request is executed in the case where the user-client pair is permitted to access the LBA range specified in the access request. In other words, the CPU 14 can perform control so that processing based on the access request is not executed in the case where the user-client pair is not permitted to access the LBA range specified in the access request. Thus, the CPU 14 can enhance the security of access to the nonvolatile memory 6.

Second Embodiment

While in the first embodiment, transfer of a request, a response, data, etc., between the storage device 5 and the client device 2 is performed via the server device 3, a second embodiment differs in that it is configured to perform transfer directly, without passing through other devices such as a server device. In other words, a memory system of the second embodiment differs in that a client device 2 is directly connected to a host I/F 11 of a storage device 5.

The second embodiment is described in detail below.

Figure 12:
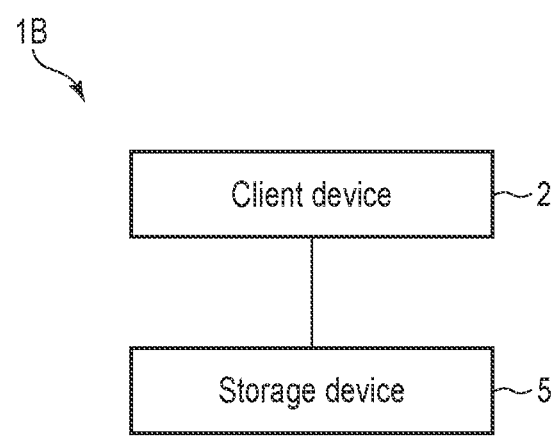
FIG. 12 is a block diagram illustrating an example of an overall configuration of an information processing system in which a storage device according to a second embodiment is directly connected to a client device.

FIG. 12 is a block diagram illustrating an example of an overall configuration of an information processing system 1B in which the storage device 5 according to the second embodiment is directly connected to the client device 2. The information processing system 1B includes, for example, the client device 2 and the storage device 5.

The configuration of the storage device 5 of the second embodiment is the same as that of the storage device 5 of the first embodiment in FIG. 2. The configuration of the client device 2 of the second embodiment is almost the same as the configuration of the client device 2 of the first embodiment, except that it further includes a configuration to authenticate an account based on account information. The configuration for performing account authentication is the same as the configuration in which the server device 3 performs account authentication in the first embodiment.

With reference to FIG. 13 to FIG. 17, processing in the information processing system 1B will be described.

FIG. 13 is a sequence diagram illustrating an example of registration processing between the storage device 5 according to the second embodiment and the client device 2. The registration processing is processing of registering user-client information to the storage device 5.

Account information is input to the client device 2. The account information includes, for example, a user ID and a password. The user ID and the password are input, for example, by an input device provided with the client device 2, based on an operation by a user.

The client device 2 authenticates an account based on the input account information (F11). More specifically, the client device 2 determines whether or not at least one piece of account information stored and set in advance (hereinafter referred to as set account information) includes account information that matches the input account information. In a case where there is set account information that includes a user ID that matches the user ID in the input account information and includes a password that matches the password in the input account information, the client device 2 determines that the account authentication is successful. In a case where there is no set account information that includes a user ID that matches the user ID in the input account information, the client device 2 determines that the account authentication is not successful. Furthermore, in a case where there is set account information that includes a user ID that matches the user ID in the input account information but includes a password that differs from the password in the input account information, the client device 2 determines that the account authentication is not successful. In the case where the account authentication is not successful, the user-client information is not registered to the storage device 5.

Registration of the user-client information to the storage device 5 is performed in a case where the account authentication is successful. The following describes a case in which the account authentication is successful.

In the case where the account authentication is successful, the client device 2 generates authentication information (F12). Specifically, the client device 2 generates a hash value calculated from data that is composed of the user ID and a device ID of the client device 2, as the authentication information. Then, the client device 2 transmits user-client information that includes the user ID and the generated authentication information, to the storage device 5 (F13).

When having received the user-client information from the client device 2, a registration processing module 141 of the storage device 5 registers the received user-client information in an authentication/access rights management table 32 (F14). Specifically, the registration processing module 141 extracts the user ID and the authentication information from the received user-client information. Then, the registration processing module 141 adds an entry including the extracted user ID and authentication information to the authentication/access rights management table 32.

Through the registration processing described above, user-client information corresponding to a pair of the client device 2 and a user using the client device 2 can be registered to the storage device 5. This enables the storage device 5 to authenticate the user-client pair by using the authentication/access rights management table 32.

FIG. 14 is a sequence diagram illustrating an example of authentication/read processing between the storage device 5 according to the second embodiment and the client device 2. The authentication/read processing is processing of authenticating a user-client pair and performing read processing. The authentication/read processing is performed in a case where the client device 2 requests to read user data from the storage device 5.

Processing for account authentication in G101 is the similar as the processing in F11 described above with reference to FIG. 13. Note that, in a case where an account has been authenticated before starting the authentication/read processing and the authentication is successful, the processing in G101 may be omitted.

After the success of the account authentication, the client device 2 generates authentication information and a read request (G102). The client device 2 transmits, to the storage device 5, user-client information that includes the user ID and the generated authentication information, and the generated read request (G103).

When having received the user-client information and the read request from the client device 2, an authentication processing module 142 of the storage device 5 authenticates a user-client pair based on the received user-client information by using the authentication/access rights management table 32 (G104).

In a case where the authentication of the user-client pair is successful, the authentication processing module 142 transmits the received read request to a read/write processing module 144 (G105). When having received the read request from the authentication processing module 142, the read/write processing module 144 performs read processing on a nonvolatile memory 6, based on the read request (G106). The storage device 5 then transmits the read user data to the client device 2 (G107).

Thus, the client device 2 can obtain the user data requested to be read with the read request.

Furthermore, in a case where the authentication of the user-client pair is not successful, the authentication processing module 142 transmits a response indicating that the authentication of the user-client pair is not successful to the client device 2 (G108). Note that the storage device 5 may transmit a response indicating that the read processing based on the read request has failed to the client device 2.

Thus, the client device 2 can recognize that the authentication of the user-client pair has failed or that the read processing based on the read request has failed.

Through the authentication/read processing described above, the storage device 5 authenticates the user-client pair and, in the case where the authentication is successful, can perform read processing based on the read request. If the storage device 5 receives a read request along with user-client information that is not registered in the authentication/access rights management table 32, the read processing based on the read request is not performed. In other words, the storage device 5 does not accept a read request from a user-client pair that does not have legitimate user-client information. This enables the storage device 5 to enhance the security of access to the nonvolatile memory 6.

Figure 15:
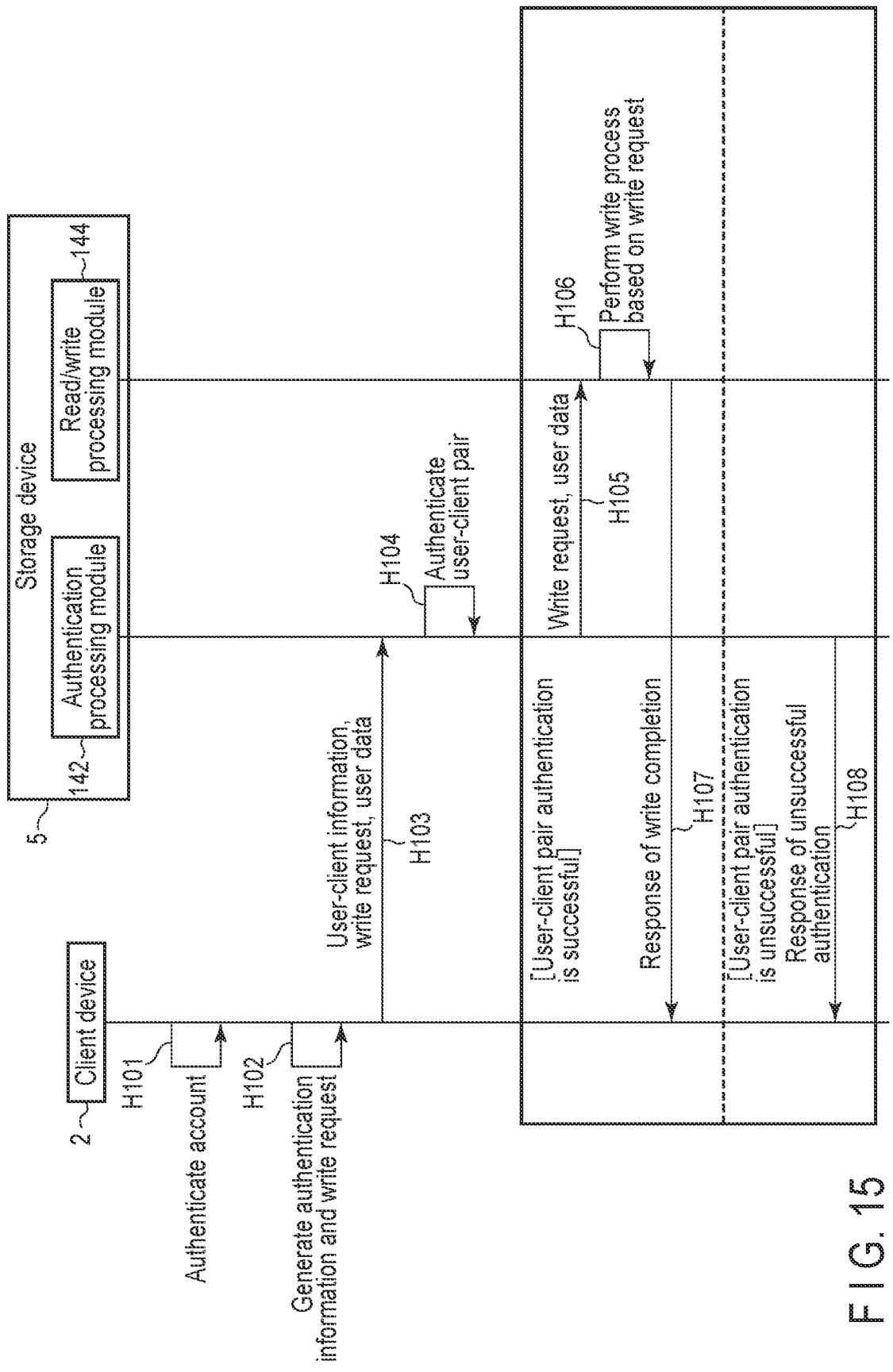
FIG. 15 is a sequence diagram illustrating an example of authentication/write processing between the storage device according to the second embodiment and the client device.

FIG. 15 is a sequence diagram illustrating an example of authentication/write processing between the client device 2 and the storage device 5 according to the second embodiment. The authentication/write processing is processing that authenticates a user-client pair and performs write processing. The authentication/write processing is performed in a case where the client device 2 requests to write user data to the storage device 5.

Processing for account authentication in H101 is the similar as the processing in F11 described above with reference to FIG. 13.

After the success of the account authentication, the client device 2 generates authentication information and a write request (H102). The client device 2 transmits, to the storage device 5, the user-client information that includes the user ID and the generated authentication information, the generated write request, and user data to be written (H103).

When having received the user-client information, the write request, and the user data from the client device 2, the authentication processing module 142 of the storage device 5 authenticates a user-client pair based on the received user-client information by using the authentication/access rights management table 32 (H104).

In a case where the authentication of the user-client pair is successful, the authentication processing module 142 sends the received write request and the user data to the read/write processing module 144 (H105).

When having received the write request and the user data from the authentication processing module 142, the read/write processing module 144 performs write processing on the nonvolatile memory 6, based on the write request (H106). Then, the read/write processing module 144 transmits a response indicating that the write processing based on the write request has been completed to the server device 3 (H107).

Thus, the client device 2 recognizes that writing based on the write request has been completed.

Furthermore, in a case where the authentication of the user-client pair is not successful, the authentication processing module 142 transmits a response indicating that the authentication of the user-client pair is not successful to the client device 2 (H107). Note that the authentication processing module 142 may transmit a response indicating that the write processing based on the write request has failed to the client device 2.

Thus, the client device 2 recognizes that the authentication of the user-client pair has failed or that the write processing based on the write request has failed.

Through the authentication/write processing described above, the storage device 5 authenticates the user-client pair and, in the case where the authentication is successful, can perform write processing based on the write request. If the storage device 5 receives a write request along with user-client information that is not registered in the authentication/access rights management table 32, write processing based on the write request is not performed. In other words, the storage device 5 does not accept a write request from a user-client pair that does not have legitimate user-client information. Therefore, the storage device 5 can enhance the security of access to the nonvolatile memory 6.

FIG. 16 is a sequence diagram illustrating another example of the registration processing between the storage device 5 according to the second embodiment and the client device 2. The registration processing illustrated in FIG. 16 is processing of registering access rights information in addition to user-client information to the storage device 5.

Processing for account authentication in K11 is the similar as the processing in F11 described above with reference to FIG. 13.

After the success of the account authentication, the client device 2 generates authentication information and access rights information (K12). The client device 2 then transmits, to the storage device 5, user-client information that includes the user ID and the generated authentication information, and the generated access rights information (K13).

When having received the user-client information and the access rights information from the client device 2, the registration processing module 141 of the storage device 5 registers the received user-client information and access rights information in the authentication/access rights management table 32 (K14).

Through the above registration processing, the user-client information that corresponds to a pair (user-client pair) of the client device 2 and a user using the client device 2, and the access rights information that corresponds to the user-client pair can be registered in the storage device 5. This enables the storage device 5 to authenticate the user-client pair by using the authentication/access rights management table 32. The storage device 5 can also control access to the nonvolatile memory 6 by the user-client pair that has been successfully authenticated, for example, for each LBA range by using the authentication/access rights management table 32. Thus, the storage device 5 can enhance the security of access to the nonvolatile memory 6.

FIG. 17 is a sequence diagram illustrating another example of the authentication/read processing between the storage device 5 according to the second embodiment and the client device 2.

Processing from L101 to L104 is the similar as the processing from G101 to G104 described above with reference to FIG. 14. Furthermore, the processing in a case where the authentication of the user-client pair has failed in L104 is the similar as the processing in G108 described above with reference to FIG. 14.

The following describes processing in a case where the authentication of the user-client pair is successful in L104.

In the case where the authentication of the user-client pair is successful, the authentication processing module 142 of the storage device 5 sends, to an access control module 143, the user-client information and the read request received from the client device 2 (L105).

When having received the user-client information and the read request from the authentication processing module 142, the access control module 143 determines whether or not the user-client pair is permitted to read from the LBA range specified in the read request by using the authentication/access rights management table 32 (L106).

In a case where the user-client pair is permitted to read from the LBA range specified in the read request, the access control module 143 sends the read request to the read/write processing module 144 (L107).

When having received the read request from the access control module 143, the read/write processing module 144 performs read processing on the nonvolatile memory 6, based on the read request (L108). Then, the read/write processing module 144 transmits the read user data to the client device 2 (L109).

Thus, the client device 2 can obtain the user data requested to be read with the read request.

Furthermore, in a case where the user-client pair is not permitted to read from the LBA range specified in the read request, the access control module 143 transmits a response indicating that reading from the LBA range specified in the read request is inhibited to client device 2 (L110). Note that the storage device 5 may transmit a response indicating that the read processing based on the read request has failed to the client device 2.

Thus, the client device 2 recognizes that reading from the LBA range specified in the read request is inhibited, or that the read processing based on the read request has failed.

Through the authentication/read processing described above, the storage device 5 authenticates the user-client pair and, in the case where the authentication is successful and reading from the LBA range specified in the read request is permitted, can perform read processing based on the read request. If the storage device 5 receives a read request together with user-client information that is not registered in the authentication/access rights management table 32, read processing based on the read request is not performed. In other words, the storage device 5 does not accept a read request from a user-client pair that does not have legitimate user-client information. Furthermore, if the storage device 5 receives a read request that specifies an LBA range for which reading is not permitted, read processing based on the read request is not performed. In other words, the storage device 5 does not accept the read request even from a user-client pair that has legitimate user-client information if the read request specifies an LBA range for which reading is not permitted.

Note that, in the same manner, also in the authentication/write processing, the storage device 5 can perform write processing based only on a write request that specifies an LBA range for which writing is permitted. In other words, the storage device 5 does not accept a write request that specifies an LBA range for which writing is not permitted.

Therefore, the storage device 5 can enhance the security of access to the nonvolatile memory 6.

Note that the procedure of processes executed in the storage device 5 of the second embodiment is realized, for example, by replacing the server device 3 with the client device 2 in the procedure of the processes described above with reference to the flowcharts from FIG. 9 to FIG. 11.

As described above, according to the first and second embodiments, security of access to the nonvolatile memory 6 can be enhanced. The registration processing module 141 of the storage device 5 manages first user identification information and first authentication information that includes a hash value calculated from the first user identification information and first device identification information of a first client device. The authentication processing module 142 receives an access request to the nonvolatile memory 6, user identification information, and authentication information transmitted from an external device. The authentication processing module 142 accepts the access request to the nonvolatile memory in a case where a first condition that the user identification information received matches the first user identification information and the authentication information received matches the first authentication information is satisfied, and rejects the access request in a case where the first condition is not satisfied.

Thus, the storage device 5 accepts the access request in the case where the first condition that the user identification information received from the external device matches the first user identification information, and the authentication information received from the external device matches the first authentication information, is satisfied. Furthermore, the storage device 5 rejects the access request in the case where the first condition is not satisfied. That is, in a case where the client device 2 has not transmitted a legitimate combination of user identification information and authentication information, the storage device 5 rejects the access request. Therefore, the security of access to the nonvolatile memory 6 to be enhanced.

Note that, although an example of inputting a user ID and a password to the client device 2 has been described, by introducing an input device capable of fingerprint authentication, face authentication, or vein authentication instead of the password or in addition to the password input, apparently, it is possible to provide further enhanced security to the storage device 5.

An information processing system including a storage device 5C according to a comparative example will now be described. The information processing system of the comparative example includes the storage device 5C, a client device 2C, and a server device 3C. The client device 2C is a client device used by a malicious user. The malicious user has illegally obtained account information set by the server device 3C. In other words, the account information used by the malicious user is leaked account information.

The server device 3C authenticates an account based on account information. In a case where account authentication is successful, the server device 3C relays transfer of a request, a response, data, etc., between the client device 2C and the storage device 5C. The request transmitted from the client device 2C to the storage device 5C via the server device 3C is, for example, an access request.

The storage device 5C receives an access request from the client device 2C via the server device 3C. The storage device 5C performs processing based on the received request. Note that the storage device 5C does not have a function to authenticate a user-client pair.

FIG. 18 is a sequence diagram illustrating an example of authentication/read processing between the storage device 5C according to the comparative example, the server device 3C, and the client device 2C. The authentication/read processing illustrated in FIG. 18 is processing that performs authentication based on leaked account information and read processing. Note that, in this case, the storage device 5C and the server device 3C are authorized devices used by authorized users, but the client device 2C is an unauthorized device used by a malicious unauthorized user.

First, the client device 2C transmits the leaked account information to the server device 3C (M11). The account information is input, for example, by an input device provided with the client device 2C, based on an operation by the malicious user.

The server device 3C authenticates an account based on the account information received from the client device 2C (received account information) (M12). More specifically, the server device 3C determines whether or not at least one piece of account information (set account information) stored and set in advance includes account information that matches the received account information. Because the received account information is the leaked account information, the server device 3C determines that the at least one piece of set account information includes account information that matches the received account information. The server device 3C then notifies the client device 2C that the account authentication is successful (M13).

When having received the notification from the server device 3C, the client device 2C generates a read request (M14). The client device 2C transmits the generated read request to the server device 3C (M15).

When having received the read request from the client device 2C, the server device 3C transmits the received read request to the storage device 5C (M16).

When having received the read request from the server device 3C, the storage device 5C performs read processing on a nonvolatile memory in the storage device 5C, based on the read request (M17). The storage device 5C then transmits the read user data to the server device 3C (M18).

When having received the user data from the storage device 5C, the server device 3C transmits the received user data to the client device 2C (M19).

Thus, the client device 2C can obtain the user data requested to be read with the read request.

Similarly, the client device 2C can also write user data to the storage device 5C by using a write request after an account based on the leaked account information has been successfully authenticated.

Thus, the client device 2C can have the account successfully authenticated by the server device 3C by using the leaked account information. Therefore, the client device 2C can obtain user data from the storage device 5C. Also, the client device 2C can write user data to the storage device 5C. Therefore, with only the method of authenticating an account by the server device 3C of the comparative example, in a case where account information is leaked, there is a possibility that any client device 2C may perform unauthorized access to the storage device 5C.

Each of various functions described in the first and second embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A storage device comprising:
 a nonvolatile memory; and
 a controller connected to the storage device and configured to:
  manage first user identification information, first authentication information, and first access rights information, the first authentication information including a hash value calculated from the first user identification information and a first device identification information of a first client device, the first authentication information and the first access rights information being associated with the first user identification information;

receive an access request to the nonvolatile memory, user identification information, and authentication information that are transmitted from an external device;

accept the access request, in a case where a first condition that the user identification information received matches the first user identification information and the authentication information received matches the first authentication information is satisfied and the first access rights information indicates that access to a storage area specified in the access request is permitted;

reject the access request in a case where the first condition is not satisfied; and reject the access request, in a case where the first condition is satisfied and the first access rights information does not indicate that access to a storage area specified in the access request is permitted.

2. The storage device of claim 1, wherein
the access request is a read request that requests reading data from the nonvolatile memory or a write request that requests writing data into the nonvolatile memory.

3. The storage device of claim 1, wherein
the first access rights information includes information that indicates permission or inhibition of access to at least a part of a storage area of the nonvolatile memory.

4. The storage device of claim 1, wherein
the access request is a read request that requests reading data from the nonvolatile memory, and
the controller is configured to:
  accept the access request, in a case where the first condition is satisfied and the first access rights information indicates that reading data from a storage area specified in the access request is permitted; and
  reject the access request, in a case where the first condition is satisfied and the first access rights information does not indicate that reading data from a storage area specified in the access request is permitted.

5. The storage device of claim 1, wherein
the access request is a write request that requests writing data into the nonvolatile memory, and
the controller is configured to:
  accept the access request, in a case where the first condition is satisfied and the first access rights information indicates that writing data into a storage area specified in the access request is permitted; and
  reject the access request, in a case where the first condition is satisfied and the first access rights information does not indicate that writing data into a storage area specified in the access request is permitted.

6. The storage device of claim 1, wherein
the controller is further configured to:
  manage the first user identification information and second authentication information that includes a hash value calculated from the first user identification information and second device identification information of a second client device that is different from the first client device;
  receive the access request, the user identification information, and the authentication information that are transmitted from the external device;
  accept the access request, in a case where a second condition that the user identification information matches the first user identification information and the authentication information matches the second authentication information, is satisfied; and
  reject the access request, in a case where neither the first condition nor the second condition is satisfied.

7. The storage device of claim 1, wherein
the controller is further configured to:
  manage third user identification information and third authentication information that includes a hash value calculated from the third user identification information and third device identification information of a third client device;
  receive the access request, the user identification information, and the authentication information that are transmitted from the external device;
  accept the access request, in a case where a third condition that the user identification information matches the third user identification information and the authentication information matches the third authentication information, is satisfied; and
  reject the access request, in a case where neither the first condition nor the third condition is satisfied.

8. The storage device of claim 7, wherein
the controller is configured to:
  manage the third user identification information, and the third authentication information and second access rights information that are associated with the third user identification information;
  receive the access request, the user identification information, and the authentication information that are transmitted from the external device;
  accept the access request, in a case where the third condition is satisfied and the second access rights information indicates that access to a storage area specified in the access request is permitted; and
  reject the access request, in a case where the third condition is satisfied and the second access rights information does not indicate that access to a storage area specified in the access request is permitted.

9. The storage device of claim 1, wherein
the controller is configured to:
  receive the first user identification information and the first authentication information from the first client device via a server device; and
  receive the access request, the user identification information, and the authentication information from the external device via the server device.

10. The storage device of claim 1, wherein
the controller is configured to:
  receive the first user identification information and the first authentication information from the first client device without passing through a server device; and
  receive the access request, the user identification information, and the authentication information from the external device without passing through the server device.

* * * * *